United States Patent
O'Dell

(10) Patent No.: US 11,468,178 B1
(45) Date of Patent: Oct. 11, 2022

(54) EMBEDDED OBFUSCATED CHANNEL CRYPTOGRAPHY

(71) Applicant: McIntire Solutions, LLC, Warrenton, VA (US)

(72) Inventor: Mark A. O'Dell, Ashburn, VA (US)

(73) Assignee: McIntire Solutions, LLC, Haymarket, VA (US)

( * ) Notice: Subject to any disclaimer, the term of this patent is extended or adjusted under 35 U.S.C. 154(b) by 157 days.

(21) Appl. No.: 17/001,765

(22) Filed: Aug. 25, 2020

Related U.S. Application Data

(60) Provisional application No. 62/907,070, filed on Sep. 27, 2019.

(51) Int. Cl.
*G06F 21/60* (2013.01)
*H04L 9/14* (2006.01)

(52) U.S. Cl.
CPC .............. *G06F 21/602* (2013.01); *H04L 9/14* (2013.01)

(58) Field of Classification Search
CPC ................................. G06F 21/602; H04L 9/14
See application file for complete search history.

(56) References Cited

U.S. PATENT DOCUMENTS

| | | | |
|---|---|---|---|
| 7,069,448 B2 | 6/2006 | Odell et al. | |
| 7,237,035 B1* | 6/2007 | Damle | H04J 3/0608 709/236 |
| 7,490,240 B2 | 2/2009 | Scheldt et al. | |
| 2005/0091501 A1* | 4/2005 | Osthoff | G06F 21/51 713/160 |
| 2009/0327703 A1* | 12/2009 | Feudo | H04L 9/321 713/168 |
| 2011/0022853 A1* | 1/2011 | Donie | G06F 21/78 713/190 |
| 2015/0371063 A1* | 12/2015 | Van Antwerpen | G09C 1/00 713/190 |
| 2016/0062920 A1* | 3/2016 | Hars | H04L 9/0618 713/193 |

* cited by examiner

*Primary Examiner* — Abiy Getachew
(74) *Attorney, Agent, or Firm* — Offit Kurman, P.A.; Gregory A. Grissett

(57) ABSTRACT

A system and method for encrypting a base payload are provided. An encryption processor receives the base payload that includes plaintext and an input command. The input command identifies cryptographic material from various cryptographic domains that is used to encrypt the base payload. The cryptographic material is assembled. Channels that include the encrypted base payload are identified. Reserved channels are identified. A header is generated. The base payload is encrypted using cryptographic material into the channels. Reserved channels are encrypted. A digital payload that includes the header, the encrypted channels and the reserved channels is generated.

16 Claims, 13 Drawing Sheets

EMBEDDED OBFUSCATED CHANNEL CRYPTOGRAPHY

CROSS-REFERENCE TO RELATED APPLICATIONS

This application claims priority to U.S. Provisional Application No. 62/907,070 filed on Sep. 27, 2019 and entitled "Embedded Obfuscated Channel Cryptography," which is incorporated by reference in its entirety.

TECHNICAL FIELD

The disclosure generally relates to digital cryptography, and more specifically to cryptographic processing using separate cryptographic channels embedded in a common payload.

BACKGROUND

Cryptography is used to protect electronic information from unauthorized alteration, manipulation, and access. To protect electronic information, symmetric or asymmetric cryptographic systems require participants or end-point computing devices to register with the cryptographic system. Once registered, the cryptographic system may provide the participants with key material that the participant may use to encrypt and decrypt the electronic information.

However, when the cryptographic system is compromised, the key material of the participants becomes known to an unauthorized third party. This allows the unauthorized third party to use the key material of the registered participant to decrypt the electronic information. Once decrypted, the unauthorized third party may modify or alter the electronic information, and then encrypt the modified electronic material using the registered participant's key material. Further, this modification can be done without the knowledge of the registered participant that encrypts the electronic information or the destination registered participant that decrypts the electronic information.

Accordingly, there is a need for cryptographic techniques that use multiple cryptographic domains to encrypt the electronic information, that provide out-of-band protection channel payload resistant mechanisms that prevent the unauthorized third party from decrypting the electronic information, and that provide third-party verification of the integrity of the electronic information, transaction validation, and endpoint identity assurance.

Figure 1:
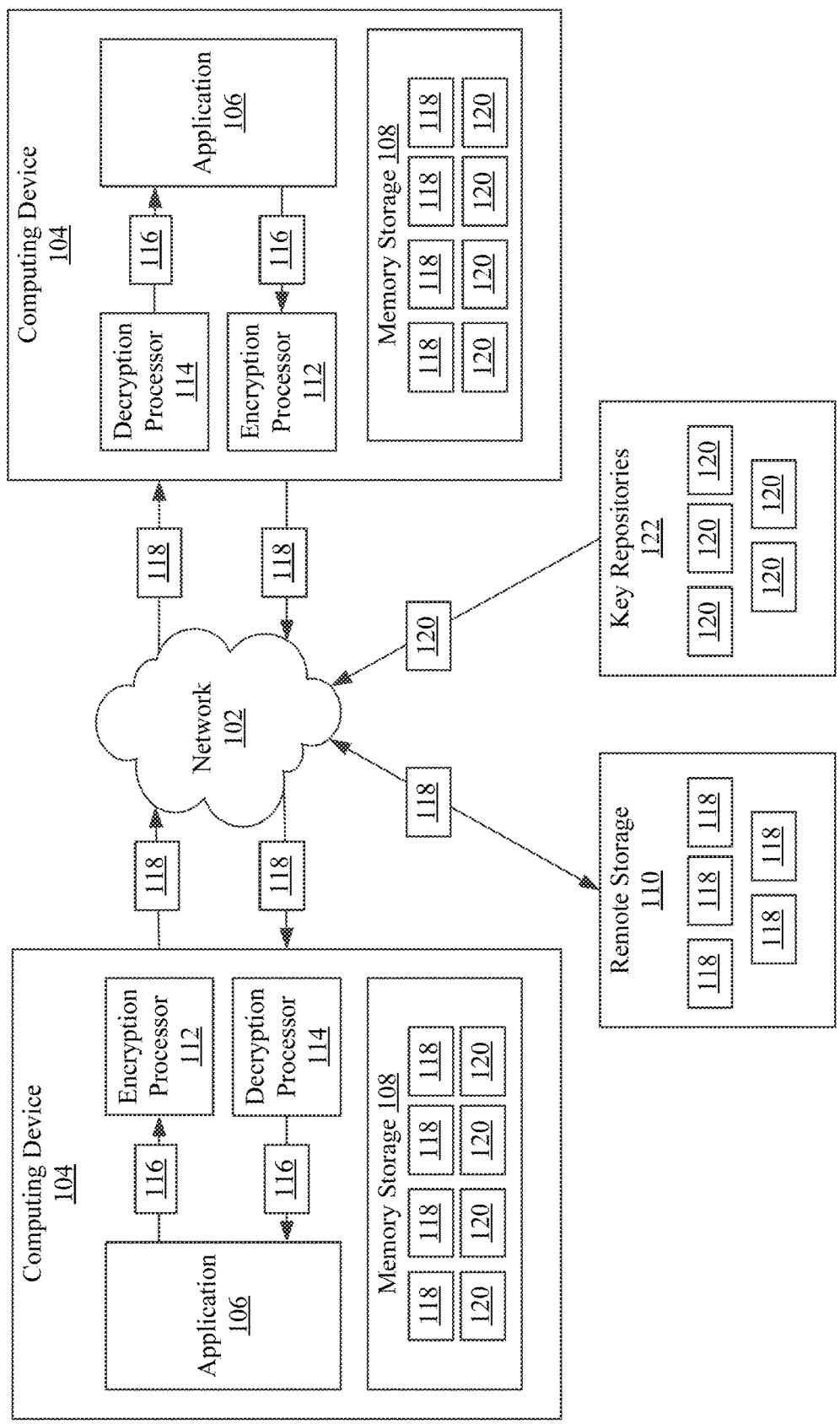
FIG. 1 is an exemplary cryptographic system where embodiments can be implemented.

Embodiments of the disclosure and their advantages as depicted by the figures described above are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments are directed to novel cryptographic techniques that may be used to encrypt and decrypt data. The cryptographic techniques include an encryption processor. Unlike conventional encryption processors, the encryption processor may encrypt base payload using multiple recursive layers of encryption and encryption with cryptographic material from different cryptographic domains within each layer.

In an embodiment, the encryption processor may include a digest processor, a payload protection processor, and a channelized protection engine. The digest processor may receive base payload from an application and may pass the base payload to the payload protection processor. The base payload may include electronic information in raw plain text or protected content. Example base payload may be digital currency.

In an embodiment, the payload protection processor may receive an input command. The input command may direct the payload protection processor to key repositories in different cryptographic domains from which the payload protection processor may obtain cryptographic material, such as tokens, keys, cryptographic functions and operations, algorithms, transactional key relationships, stenographic techniques, etc.

In an embodiment, payload protection processor may prepare the protection channel payload. The protection channel payload may include one or more channels for the base payload. For example, the payload protection processor may determine a number of channels that may be used to encrypt the base payload and identify the cryptographic material that may be used to encrypt one or more additional channels.

In an embodiment, the channelized protection payload may also include reserved channels that may be combined with the channels for the base payload. For example, the payload protection processor may also determine a number of reserved channels that may be used to protect the base payload and provide out-of-band tamper resistance mechanisms, third party verification of data integrity, transaction integrity, confidentiality separation, etc. In an embodiment, the reserved channels may include a portion of the base payload, a hash of the base payload, pointers to cryptographic functions, tokens, etc. In an embodiment, the payload protection processor also identifies the cryptographic material that the encryption processor may use to encrypt the reserved channels.

In an embodiment, the payload protection processor may generate a header. The header may include pointers to the cryptographic domains and/or cryptographic material included in the cryptographic domains that may be used to encrypt and decrypt the base payload and the reserved channels.

In an embodiment, once payload protection processor generates the channelized protection payload, the payload protection processor may provide the channelized protection payload to the channelized protection engine.

In an embodiment, channelized protection engine receives the base payload from message digest and the channelized protection payload from the payload protection processor. Channelized protection engine may then encrypt the base payload and reserved channels as determined in the channelized protection payload.

In an embodiment, channelized protection engine generates a digital payload that includes the header, the encrypted base payload (referred to as payload) and the reserved channels.

In one embodiment, the encryption processor may encrypt the base payload using a single layer of encryption. In this case, the digital payload is the output from the encryption processor.

In another embodiment, the encryption processor may encrypt the base payload using multiple layers of encryption. In this case, the channelized protection processor may pass the digital payload back to the digest processor. The digest processor may remove the header and use the header to determine how to process the rest of digital payload. Additionally, the digest processor may generate a message digest from the digital payload. The message digest may include digest for individual channels in the payload and the reserved channels of the digital payload, references to different key repositories, etc. The digest processor may then pass the header, the digital payload received from the channelized protection engine, and the message digest to the payload protection processor, and the digital payload to the channelized protection engine.

In an embodiment, the payload protection processor may use the message digest and the header to retrieve the cryptographic material that may be used to perform further encryption on the digital payload. As discussed above, the cryptographic material may be from different cryptographic domains.

Additionally, payload protection processor may also generate the channelized protection payload. For example, the payload protection processor may determine whether the digital payload may be encrypted using additional cryptographic material. In another example, the payload protection processor may determine a number of reserved channels. The reserved channels may include portions, a hash, etc., of the digital payload generated during the first layer, include cryptographic materials that may have been used to encrypt the digital payload in the previous layer, etc. Additionally, the payload protection processor may also determine the cryptographic material that may be used to encrypt each reserved channel.

As also discussed above, payload protection processor may generate a header. The header may be the header for the digital payload that may be generated in the second layer. Further, payload protection processor may pass the channelized protection payload to the channelized protection engine.

In an embodiment, the channelized protection engine may receive the digital payload encrypted during the previous layer from the digest processor and the channelized protection payload from the payload protection processor. The channelized protection engine may then encrypt the digital payload into a digital payload of the second layer as specified by the protection channel payload.

In an embodiment, the encryption process may repeat with another layer of encryption. If another layer of encryption is not required, then the channelized protection engine may output the digital payload.

In an embodiment, the cryptographic techniques may also include a decryption processor. The decryption processor decrypts digital payload that encryption processor encrypted into the base payload. Unlike conventional decryption techniques, the decryption processor may decrypt digital message using one or more layers and cryptographic material from multiple cryptographic domains.

In an embodiment, the decryption processor may also include a message digest, a payload protection processor, and a channelized protection engine. Initially, the digest processor of the decryption processor may receive the digital payload from an application. Once received, the digest processor may remove the header of the digital message and use the header to generate a message digest. As discussed above, the message digest may include the digest for individual channels in the payload and the reserved channels, references to different key repositories, cryptographic material, tokens, etc.

In an embodiment, the digest processor may pass the digital payload, the header and the message digest to the payload protection processor. Also, the digest processor may pass the digital payload to the channelized protection engine.

In an embodiment, the payload protection processor may receive an input command that directs the payload protection processor to perform a decryption process.

In an embodiment, the payload protection processor may use the message digest and the header to retrieve the cryptographic material. The channelized protection engine may use the cryptographic material to decrypt the payload and/or the reserved channels in the digital payload.

In an embodiment, the payload protection processor may generate a protection channel payload that identifies which channels in the payload and in the reserved channels may be decrypted with which cryptographic material. Further, the payload protection processor may pass the channelized protection payload to the channelized protection engine.

In an embodiment, the channelized protection engine may receive the digital payload from the digest processor and the channelized protection payload from the payload protection processor. The channelized protection engine may then decrypt the digital payload using cryptographic material indicated in the channelized protection payload. Further, in an embodiment where the decryption processor decrypts the digital payload using a single layer of encryption, the base payload is the output of the channelized protection engine.

In an embodiment where encryption processor encrypts the base payload using multiple layers of encryption, the decryption processor also decrypts the digital payload using multiple layers. In this case, the output of the channelized protection engine may be a digital payload that was encrypted within the payload of the digital payload of the preceding layer. Channelized protection processor may then pass the decrypted digital payload to the digest processor.

In an embodiment, the digest processor may remove the header of the decrypted digital payload and use the header to determine how to process the rest of digital payload. Additionally, the digest processor may generate a message digest from the digital payload. As discussed above, message digest may include a digest for individual channels in the payload and the reserved channels in the digital payload, references to different key repositories, etc. The digest processor may then pass the header, the digital payload, and the message digest to the payload protection processor and the digital payload to the channelized protection engine.

In an embodiment, the payload protection processor may use the message digest and the header to retrieve cryptographic material from different cryptographic domains. The cryptographic material may be used to decrypt the channels in the payload and the reserved channels in the digital payload. The cryptographic material that decrypts the channels that include the payload and the reserved channels may be passed to the channelized protection engine as the channelized protection payload.

In an embodiment, the decryption processor may repeat the decryption process until the decryption processes decrypts the digital payload that includes the base payload.

System Environment

FIG. 1 is an exemplary cryptographic system 100 where embodiments can be implemented. Cryptographic system 100 includes a network 102. Network 102 may be implemented as a single network or a combination of multiple networks, including local area networks (LANs), wide area networks (WANs) such as the Internet or the Word Wide Web, metropolitan area networks (MANs), etc. Network 102 may also include one or more of intranets, landline networks, wireless networks, and/or other appropriate types of networks.

Cryptographic system 100 may include one or more computing device 104. Computing device 104 may be a portable or non-portable electronic device. In some embodiments, computing device 104 may be a user-operated computing device, such as a desktop computer, a laptop computer, a smartphone, a tablet, etc. In other embodiments, computing device 104 may be a server, such as an application server, a web server, a cloud server, etc., and which stores data, resources, instructions, applications, etc. In an embodiment, computing device 104 may communicate with other computing devices 104 over network 102.

Computing device 104 may include one or more applications 106. Applications 106 may execute on computing device 104 and cause computing device 104 to process data sequentially and/or parallel. When computing device 104 processes data sequentially, computing device 104 processes different tasks one after the other in a certain order. When computing device 104 processes data in parallel, computing device 104 may operate on different tasks simultaneously, or break a single task into multiple sub-tasks, and process simultaneously some or all of the sub-tasks.

In an embodiment, there may be different kinds of applications 106. Example application 106 may be a digital currency application, a messaging application, a transaction processing application, a media or multi-media application, a financial application, a cloud storage application, etc. Application 106 may also have different components that may execute on one computing device 104 or on multiple computing devices 104.

In some embodiments, application 106 may process sensitive data. Sensitive data may be electronic data that may be viewed, manipulated, etc., by authorized parties. To ensure that the sensitive data is accessible to the authorized parties, the sensitive data may be encrypted and transmitted to another computing device 104, stored within memory storage 108 of computing device 104 or in a remote storage 110 in an encrypted form. The encrypted data may be decrypted by parties that have access to the decryption tokens or keys. In an embodiment, memory storage 108 and remote storage 110 may be a type of memory described in detail in FIG. 9.

To ensure that the sensitive data is accessible to the authorized parties, the computing device 104 may include an encryption processor 112 and a decryption processor 114. Encryption processor 112 may be implemented in hardware, software, or a combination thereof, components of which may be described in FIG. 9. Encryption processor 112 may use one or more cryptographic algorithms and one or more keys and/or tokens to translate or encrypt the sensitive data into a secret, encrypted form. Decryption processor 114 may use one or more cryptographic algorithms and one or more keys and/or tokens to translate or decrypt data into the original form. Decryption processor 114 may also be implemented in hardware, software, or a combination thereof, components of which are described in FIG. 9.

In an embodiment, encryption processor 112 and decryption processor 114 may be the same processor or may be two different and distinct processors.

In an embodiment, encryption processor 112 may receive a base payload 116 from application 106. Base payload 116 may be digital data or content that may be encrypted by encryption processor 112. Typically, base payload 116 may include sensitive data. In one embodiment, base payload 116 may include plaintext or other types of unencrypted data. In another embodiment, base payload 116 may include cipher text. Cipher text may be data that has previously been encrypted. Example, base payload 116 may depend on the type of application 106 and may include multi-media data, such as movies, video-clips, photo-media, voice media, media access data, etc. Another example of base payload 116 may include digital currency, multi jurisdictional currency data, and other financial data. Yet another example of base payload 116 may be various message types, such as email messages, secured messages, voice messages, multi-media messages, etc. Yet another example of base payload may be personal data, health data, etc.

In an embodiment, encryption processor 112 may encrypt base payload 116 into digital payload 118, described below. To encrypt base payload 116, encryption processor 112 may use one or more cryptographic algorithms stored in memory storage 108 of computing device 104, within the memory of encryption processor 112 or elsewhere over network 102. In addition to one or more cryptographic algorithms, encryption processor 112 may also use one or more cryptographic key or tokens, collectively referred to as tokens 120. Example tokens 120 may be symmetric keys, asymmetric keys, private keys, public keys, authentication keys, one-time pads ("OTPs"), or combination keys, etc. Further, tokens 120 may be specific to application 106, a user using application 106, an entity that owns or operates application 106, data included in the transaction, etc. Further, tokens 120 may be associated with a person or persons, data, devices, transactions, etc.

In an embodiment, encryption processor 112 may encrypt base payload 116 using single layer encryption or multi-layer encryption. In a single layer encryption, encryption processor 112 may encrypt multiple portions of base payload 116 sequentially or in parallel. In a multi-layer encryption, encryption processor 112 may recursively encrypt one or more portions of base payload 116.

Once encrypted, application 106 may cause computing device 104 to transmit digital payload 118 over network 102 to another computing device 104, store digital payload 118 in memory storage 108 or remote storage 110. To transmit digital payload 118 over network 102 digital payload 118 may be formatted into a message conducive for transmission over network 102.

In an embodiment, decryption processor 114 may decrypt digital payload 118 back to base payload 116. Base payload 116 may be plaintext that may be read by application 106 and accessible to users. To decrypt digital payload 118, decryption processor 114 may use one or more cryptographic algorithms that were used to encrypt digital payload 118 and one or more tokens 120. In an embodiment, decryption processor 114 may use the same token 120 that encryption processor 112 used to encrypt base payload 116 if token 120 is a symmetric token. In this case, token 120 and the counterpart to token 120 is the same token 120. In another embodiment, decryption processor 114 may use a cryptographic counterpart to token 120 that encryption processor 112 processor utilized to encrypt base payload 116 into digital payload 118. Example cryptographic counterpart may be a public key of a public-private key pair where encryption processor 112 would have used a public key to encrypt base payload 116 into digital payload and decryption processor 114 would use a private key of the public-private key pair to decrypt digital payload 118 into base payload 116. In an embodiment, multiple tokens 120 may be used to encrypt payload and multiple counterpart tokens 120.

In an embodiment, decryption processor 114 may use tokens 120 to decrypt digital payload 118. Typically, tokens 120 that may be used to decrypt digital payload 118 are counterparts to tokens used to encrypt base payload 116 into digital payload 118. Decryption tokens 120 may be owned or accessible to an entity authorized to access base payload 116.

In an embodiment, decryption processor 114 may decrypt digital payload 118 using single layer decryption or multi-layer decryption. In the single layer decryption, decryption processor 114 may decrypt multiple portions of digital payload 118 sequentially or in parallel. In the multi-layer decryption, decryption processor 114 may recursively decrypt one or more portions of digital payload 118 until decryption processor 114 decrypts base payload 116 from digital payload 118.

As illustrated in FIG. 1, tokens 120 may be stored in one or more key repositories 122 or within secured or non-secured portions of memory storage 108. Key repository 122 may be accessed over network 102 or be within or coupled to computing device 104 (not shown). Key repository 122 may be a key store, such as a vault of a key management system, a key material repository, a hardware security module that may be a physical computing device that safeguards and manages digital keys for strong authentication, a smartcard, a secured memory within or outside of computing device 104, etc. Typically, each key repository 122 may belong to a cryptographic domain and may require a party to register in order to associate one or more tokens 120 with the party. Accordingly, if a party is a member of two cryptographic domains, a party may register with the first cryptographic domain and with the second cryptographic domain.

Encryption processor 112 or decryption processor 114 may access key repository 122 for tokens 120 stored on that key repository 122 to encrypt base payload 116 into digital payload 118 or decrypt digital payload 118 into base payload 116.

Unlike conventional cryptographic systems, encryption processor 112 and decryption processor 114 may use tokens 120 from multiple key repositories 122 to encrypt base payload 116 or decrypt digital payload 118. In this way, if one of key repositories 122 is compromised by an unauthorized third party, only a portion of digital payload 118 may be accessible or compromised by the unauthorized third party. Further, even if the unauthorized third party may decrypt and modify a portion of base payload 116, digital payload 118 may include a verification mechanism that may indicate to an authorized party that an unauthorized third party may have modified the base payload 116.

Structure of the Digital Payload

Figure 2:
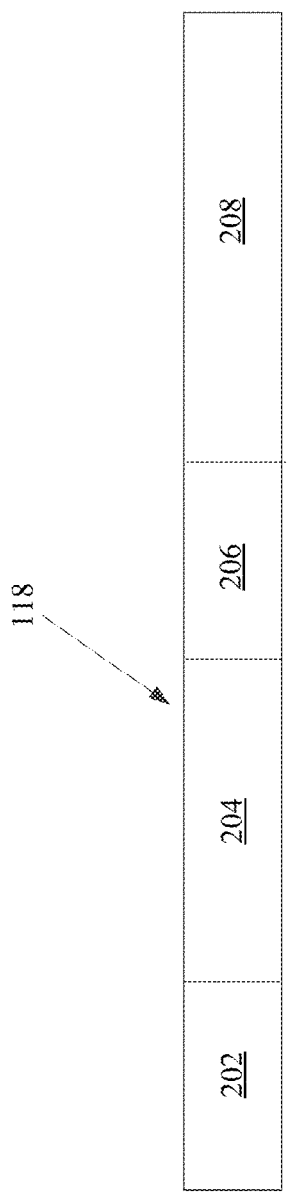
FIG. 2 is a block diagram of a digital payload, according to an embodiment.

FIG. 2 is a block diagram 200 is a digital payload, according to an embodiment. Digital payload 118 may be the output of encryption processor 112 and an input to decryption processor 114 of FIG. 1.

In an embodiment, digital payload 118 may be a computing structure that includes one or more components and may have fixed or variable size. As illustrated in FIG. 2, example components of digital payload 118 may be a header 202, a payload 204, a public information section 206, and one or more reserved channels 208.

In an embodiment, header 202 may identify how to process digital payload 118. Header 202 may reference a number of channels used to encrypt base payload 116, a number of reserved channels 208 that are described below, etc. Also, header 202 may store pointers to cryptographic domains or locations of one or more key repositories 122 that store tokens 120, cryptographic algorithms, etc. Example domains or locations may be a uniform resource location, an Internet protocol address, etc. Each channel in the number of channels or in reserved channels 208 is a specified pathway for conveying protected information within digital payload 118.

In an embodiment, header 202 may be an unencrypted portion of digital payload 118 that can be traversed and parsed by encryption processor 112 and decryption processor 114.

In an embodiment, payload 204 may be a cipher text portion of digital payload 118. Payload 204 may store a portion or entire encrypted base payload 116. Payload 204 may also include digital payload 118 when encryption processor 112 performs multi-layer encryption. In this case, encryption processor 112 may encrypt base payload 116 in payload 204 of digital payload 118 in the first layer of encryption. Next, encryption processor 112 may encrypt digital payload 118 from the first layer of encryption within payload 204 of the digital payload 118 that was generated in the second layer of encryption.

In an embodiment, payload 204 may include one or more secured channels or simply channels. Each secured channel may be used for auxiliary cryptographic functions and out of band operations, such as authentication that ensures that sender and receiver of digital payload 118 are who or what they claim to be, confidentiality that ensures that data in digital payload 118 is read by authorized users, data integrity that ensures that data is not changed from source to destination, and non-repudiation where sender and receiver cannot deny messages. In an embodiment, each secured channel may be encrypted using token 120 from key repository 122 that is in a different cryptographic domain from other tokens 120.

In an embodiment, public information section 206 may be a portion of digital payload 118 that may store identifier information associated with digital payload 118. Example identifier information may be the size of digital payload 118, the size of header 202, the size of payload 204, the size and number of reserved channels 208, etc. Further, public information section 206 may be an unencrypted portion of digital payload 118.

In an embodiment, reserved channels 208 may be extensions to payload 204. In some embodiments, reserved channels 208 may be referred to as auxiliary payload. Reserved channels 208 may be encrypted channels and may include data, cryptographic functions, tokens 120, pointers to tokens 120, pointers to cryptographic domains, etc., that may be referenced by payload 204. This means that reserved channels 208 may include cipher text that is out-of-band with the cipher text included in payload 204. Because reserved channels 208 are out-of-band with payload 204, reserved channels 208 may be used to determine whether a third party has tampered with payload 204, provide control for payload 204 when payload 204 is outside of the control of application 106, provide additional encryption for payload 204, etc.

In another example, reserved channels 208 may be used to manipulate tokens 120 in key repository 122. For example, reserved channel 208 may store an instruction for a key repository 122 to change its key structure by revoking or replacing token 120.

In yet another example, reserved channels 208 may also include instructions that may manipulate base payload 118. For example, reserved channel 208 may have an instruction to delete digital payload 118 after a preconfigured time period.

Encryption Processor

Figure 3A:
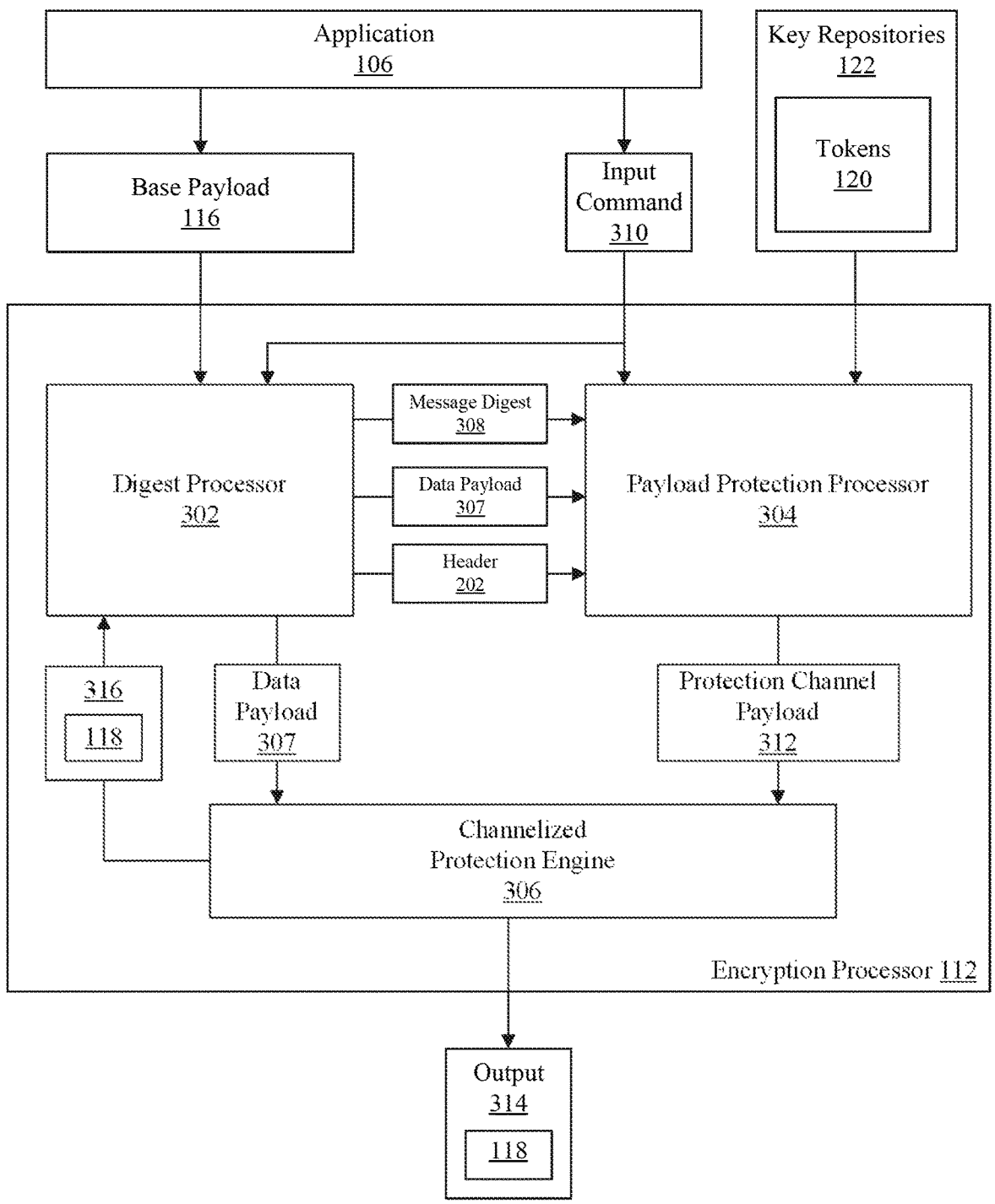
FIGS. 3A and 3B are block diagrams of an encryption processor, according to an embodiment.
Figure 3B:
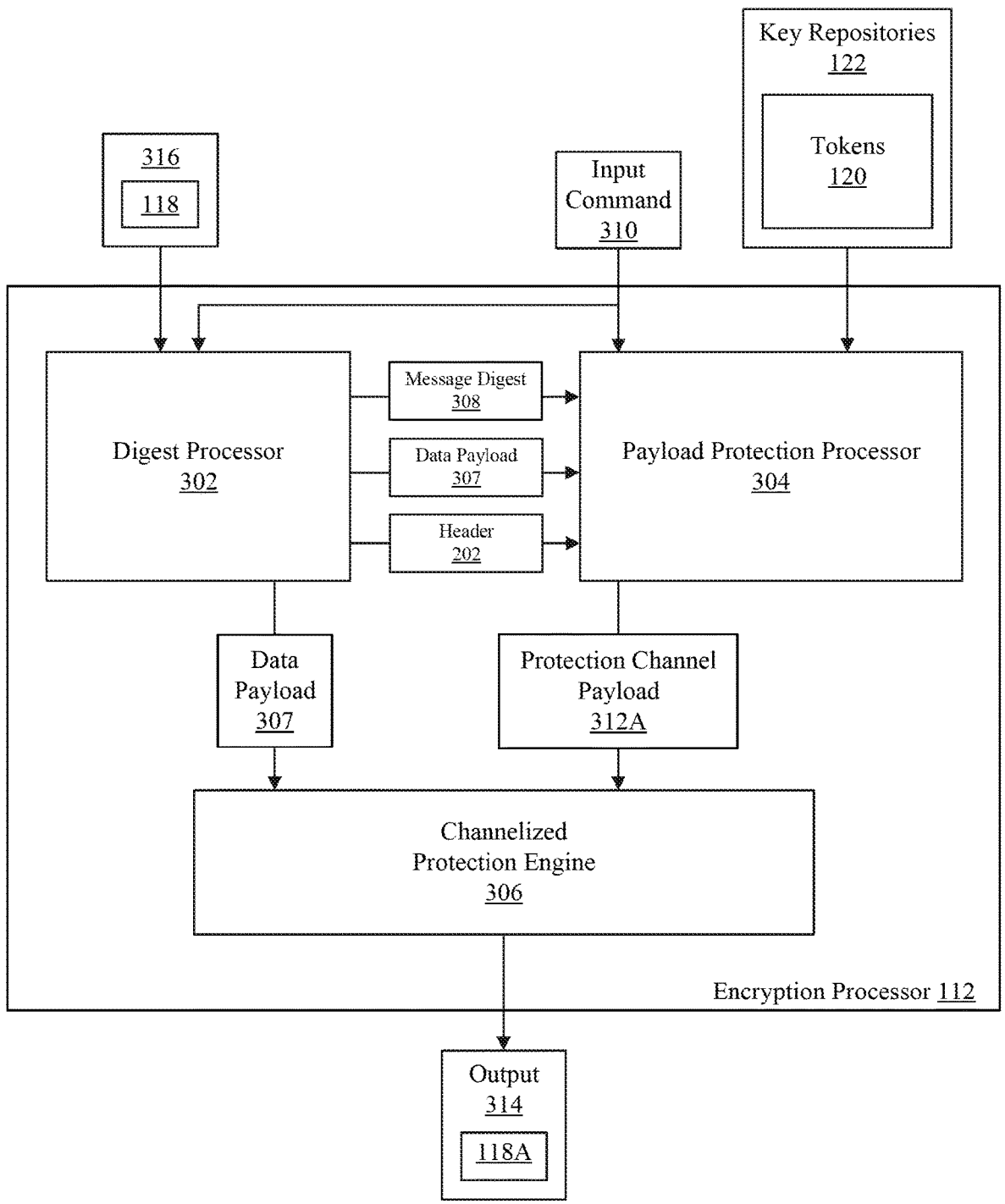

FIGS. 3A and 3B are block diagrams 300A and 300B of an encryption processor, according to an embodiment. As illustrated in FIG. 3A, encryption processor 112 includes a digest processor 302, payload protection processor 304, and channelized protection engine 306. Digest processor 302, payload protection processor 304, and channelized protection engine 306 can be implemented in hardware, software, or a combination thereof. Although shown as part of a single device, encryption processor 112 and its components may be implemented on multiple computing devices.

In an embodiment, digest processor 302 may receive base payload 116 as input. As discussed above, base payload 116 may be unencrypted plaintext or cipher text provided by application 106. Base payload 116 may include data that may be encrypted, may include a header, metadata or other information that facilitates delivery of the data. Base payloads 116 may also contain header 202 if previously processed by an encryption processor 112, as will be discussed in FIG. 3B, below.

In an embodiment, digest processor 302 may generate a data payload 307 from base payload 116. When digest processor 302 receives base payload 116 for the first time, data payload 307 may be base payload 116. Digest processor 302 may pass or transmit data payload 307 to payload protection processor 304. Additionally, digest processor 302 may pass or transmit data payload 307 to channelized protection engine 306.

In an embodiment, digest processor 302 may generate message digest 308 by taking a hash of base payload 116 using a cryptographic function. Digest processor 302 may receive the cryptographic function from an input command 310. Once generated, digest processor 302 may pass or transmit message digest 308 to payload protection processor 304.

In an embodiment, when base payload 116 includes header 202, digest processor 302 may also remove header 202 from base payload 116, and pass or transmit header 202 to payload protection processor 304.

In an embodiment, payload protection processor 304 may receive data payload 307 from digest processor 302. In an embodiment, payload protection processor 304 may also receive an input command 310 from application 106 or from a configuration file that may provide input to encryption processor 112. Input command 310 may provide payload protection processor 304 with input parameters that control operations that channelized protection engine 306 may perform on data payload 307. For example, input command 310 may indicate whether payload protection processor 304 may encrypt data payload 307, decrypt digital payload 118 (as will be discussed in FIGS. 6A and 6B). In another example, input command 310 may also identify the number of channels and/or reserved channels 208 that may be used to encrypt data payload 307. In another example, input command 310 may identify the number of times (or layers) encryption processor 112 may encrypt data payload 307 recursively. In another example, input command 310 may also identify how to process data payload 307, recursively recycle data payload 307 (as discussed in FIG. 3B), index channels, obfuscate channels, embed additional key references, and perform additional recursive functions. In yet another example, input command 310 may identify which cryptographic functions may be used to encrypt digital payload 307, various cryptographic methodologies that may be used for encryption or decryption, references to one or more key repositories 122, references to tokens 120, etc.

In an embodiment, payload protection processor 304 may use parameters included in input command 310 to assemble cryptographic material that channel protection engine 306 may use to encrypt data payload 307. To assemble cryptographic material, payload protection processor 304 may access and retrieve tokens 120 from one or more key repositories 122 in various cryptographic domains and/or memory storage 108, retrieve cryptographic functions, algorithms, etc. Example cryptographic algorithms may include an Advanced Encryption Standard ("AES") algorithm, blowfish algorithm, data encryption standard ("DES") algorithm, Rivest, Shamir, Adleman ("RSA"), twofish algorithm, elliptic curve algorithms, or another algorithm used to encrypt data payload 307.

Additionally, payload protection processor 304 may also use input command 310 to assemble cryptographic material that may be included or used to encrypt one or more reserved channels 208. The cryptographic material may include portions of data payload 307, a hash of data payload 307, token 120 or a pointer to token 120 that was used to encrypt data payload 307, etc.

Once payload protection processor 304 assembles cryptographic material, payload protection processor 304 may assemble a protection channel payload 312. Protection channel payload 312 may determine a number of channels that may be used to augment data payload 307, a number of reserved channels 208, and the content that may be included in reserved channels 208. Further, protection channel payload 312 may identify which cryptographic material, including tokens 120, cryptographic functions, etc., may be used to encrypt one or more channels that include data payload 307 and/or reserved channel 208.

In an embodiment, protection channel payload 312 may also determine whether data payload 307 may be encrypted using multi-layered or single layered encryption. In a multi-layered encryption, data payload 307 may be encrypted recursively multiple times, and each encryption may involve one or more channels in payload 204 and reserved channels 208. In the multi-layer encryption, digital payload 118 that may be generated during one layer may be encrypted in payload 204 of another layer. In a single layer encryption, data payload 307 may be encrypted once using one or more channels in payload 204 and one or more reserved channels 208.

In an embodiment, during encryption, payload protection processor 304 may also generate header 202. Header 202 may identify the cryptographic material and cryptographic domains that may be used to encrypt digital payload 118. As discussed above, header 202 may include pointers to various cryptographic functions, tokens 120, key repositories 122, etc., that were used to encrypt base payload 116.

Once payload protection processor 304 assembles protection channel payload 312, payload protection processor 304 may pass protection channel payload 312 to channelized protection engine 306.

Channelized protection engine 306 may receive data payload 307 from digest processor 302 and protection channel payload 312 from payload protection processor 304. Channelized protection engine 306 may then encrypt data payload 307 using information in protection channel payload 312. As discussed above, the information in protection channel payload 312 may include additional channels that may be used to encrypt data payload 307 as payload 204, references to tokens 120, references to cryptographic functions and algorithms that may be used to encrypt each channel, the number of reserved channels 208, the content that may be encrypted in one or more reserved channels 208, cryptographic functions and algorithms that may be used to encrypt one or more reserved channels 208, etc., in additional encryption layers.

In an embodiment, channelized protection engine 306 may generate various outputs. In an embodiment, where channelized protection engine 306 encrypts data payload 307 using a single layer, channelized protection engine 306 may generate output 314. Output 314 may be cipher text that is the final encrypted output of channelized protection engine 306. In an embodiment, output 314 may be digital payload 118 discussed in FIG. 2. As discussed above, digital payload 118 in output 314 may be stored in memory storage 108 of computing device 104, remote storage 110 or be transmitted to other computing devices 104.

In an embodiment, where channelized protection engine 306 may encrypt data payload 307 using multiple layers, channelized protection engine 306 may generate output 316. Output 316 may be digital payload 118 that is passed or transmitted to digest processor 302 for another layer of encryption processing.

FIG. 3B is a block diagram 300B of an encryption processor performing multi-layer encryption processing, according to an embodiment. As illustrated in FIG. 3B, digest processor 302 may receive input that is output 316 of channelized protection engine 306 discussed in FIG. 3A, and which may be encrypted digital payload 118.

When digest processor 302 receives encrypted digital payload 118, digest processor 302 may parse digital payload 118 and extract header 202. As discussed above, header 202 may be an unencrypted portion of digital payload 118 from a previous processing layer. Header 202 may be used by digest processor 302 and payload protection processor 304 to identify how to process digital payload 118. For example, header 202 may include pointers to key materials, such as tokens 120, pointers to key repositories 122 in different cryptographic domains, pointers to devices that include key repositories 122, or cryptographic domains where key repositories 122 can be found. In another example, header 202 may include pointers to cryptographic functions and algorithms that may be used to encrypt digital payload 118, etc.

In an embodiment, digest processor 302 may generate message digest 308 from digital payload 118. Message digest 308 may be a hash of digital payload 118. Message digest 308 may also be a digest of individual channels in payload 204 and/or reserved channels 208 in digital payload 118, references to different key repositories 122 that may be used to obtain tokens 120, etc. As discussed above, digest processor 302 may generate message digest 308 by applying a cryptographic function to digital payload 118. As also discussed above, digest processor 302 may obtain the cryptographic function from input command 310.

In an embodiment, digest processor 302 may also obtain data payload 307 from digital payload 118. In this case, data payload 307 may include payload 204 and/or reserved channels 208 form digital payload 118.

In an embodiment, digest processor 302 may pass or transmit header 202, message digest 308 and data payload 307 to payload protection processor 304.

In an embodiment, payload protection processor 304 may also receive input command 310. As discussed above, input command 310 may provide payload protection processor 304 with input parameters that control operations that channelized protection engine 306 may perform on data payload 307.

In an embodiment, input command 310 may indicate how to process data payload 307. For example, input command 310 may indicate a number of channels that may be used to encrypt data payload 307. Additionally, input command 310 may indicate whether one or more reserved channels 208 may be generated to encrypt or reference portions of data payload 307. As also discussed above, message digest 308 may include pointers to key repositories 122 and tokens 120 that may be used to encrypt data payload 307 and reserved channels 208 through multiple encryption layers.

In an embodiment, payload protection processor 304 may use message digest 308 to obtain references to cryptographic material. In this case, the cryptographic matter may be used to encrypt data payload 307 as payload 204 and one or more reserved channels 208 to form digital payload 118A. In an embodiment, payload protection processor 304 may use pointers and tokens 120, key repositories 122 in different cryptographic domains to obtain the cryptographic material.

In an embodiment, payload protection processor 304 may bind message digest 308 to data payload 307 using input command 310 that determines the digest function. Payload protection processor 304 may also use message digest 308 with another cryptographic function indicated by input command 310 to bind message digest 308 to header 202 and other key material to form the content of the protection channel payload 312.

In an embodiment, payload protection processor 304 may receive message digest 308 in an encrypted form. In this case, payload protection processor 304 may first unwrap or decrypt message digest 308 using one or more keys known by payload protection processor 304 or obtained by payload protection processor 304 from header 202. Once payload protection processor 304 decrypts message digest 308, payload protection processor 304 may use message digest 308 to obtain cryptographic material.

In an embodiment, payload protection processor 304 may also generate header 202 for digital payload 118A. Header 202 may be a different embedded header 202 that payload protection processor 304 received from digest processor 302 and that was included in digital payload 118. In one embodiment, payload protection processor 304 may generate a new header 202 that may indicate how to process digital payload 118A generated during the second encryption layer. In this case, header 202 from digital payload 118 may be encrypted as payload 204 or be a hidden header included in one of reserved channels 208. In another embodiment, payload protection processor 304 may append additional information such as pointers to header 202 received from digest processor 302.

In an embodiment, payload protection processor 304 may assemble protection channel payload 312A as described above. In this case, protection channel payload 312 may include cryptographic material that may encrypt data payload 307 in payload 204 and one or more reserved channels 208 of digital payload 118A. Payload protection processor 304 may then pass the assembled protection channel payload 312A to channelized protection engine 306.

When encryption processor 112 encrypts base payload 116 using multiple layers (as discussed in FIG. 3B), channelized protection engine 306 may receive data payload 307 from digest processor 302 and protection channel payload 118A from digest processor 302. Channelized protection engine 306 may then generate digital payload 118A. Digital payload 118A may include encrypted data 307 in payload 204 and reserved channel 208 encrypted using cryptographic material identified in protection channel payload 312A.

In an embodiment, if encryption processor 112 does not have to perform another layer of encryption, channelized protection engine 306 generates output 314 which includes digital payload 118A. If encryption processor 112 performs another layer of encryption, channelized protection engine 306 generates output 316 that includes digital payload 118A and passes output 316 to digest processor 302 (not shown), and repeats another layer of encryption.

Figure 4:
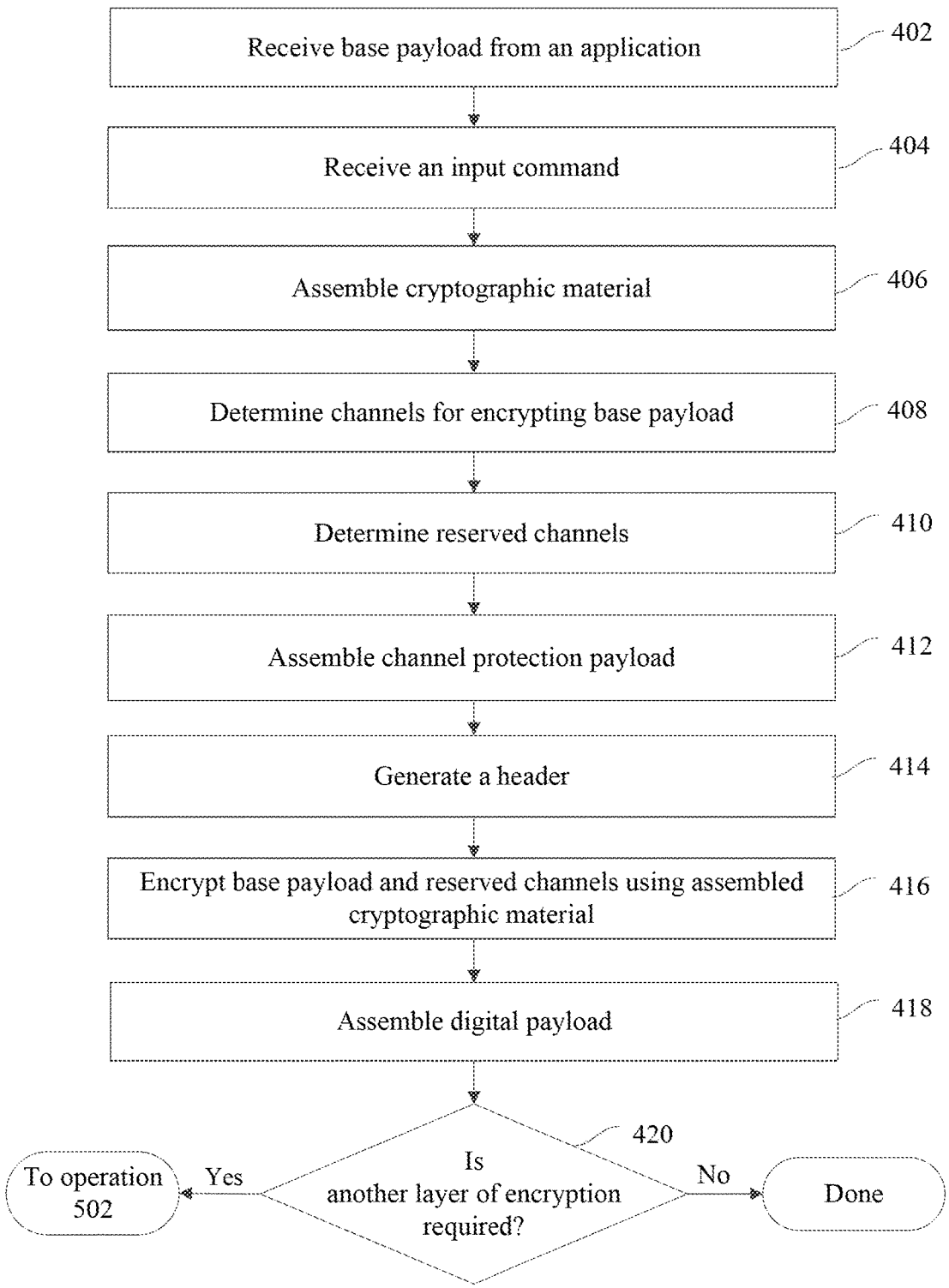
FIG. 4 is a flowchart of a method for encrypting base payload, according to an embodiment.

FIG. 4 is a flowchart of a method 400 for encrypting base payload, according to an embodiment. Method 400 may be implemented using hardware and software components described in FIGS. 1-3A-B. Note that one or more of the operations may be deleted, combined, or performed in a different order as appropriate.

At operation 402, the base payload is received. For example, encryption processor 112 may receive base payload 116 that may be plaintext or cipher text from application 106. Typically, base payload 116 includes data that has not been previously encrypted by encryption processor 112. As discussed above, digest processor 302 may receive base payload 116 and pass base payload 116 to payload protection processor 304 and channelized protection engine 306 as digital payload 307.

At operation 404, an input command is received. For example, payload protection processor 304 may receive input command 310. As discussed above, input command 310 may include pointers to the cryptographic material, such as pointers to key repositories 122 in different cryptographic domains, tokens 120 stored in key repositories 122, one or more cryptographic functions, etc. Input command 310 may also indicate whether encryption or decryption process may be performed and a number of layers that may be used to encrypt base payload 116.

At operation 406, cryptographic material is assembled. For example, payload protection processor 304 may assemble cryptographic material using algorithms and pointers referenced in input command 310.

At operation 408, channels for encrypting base payload are determined. For example, payload protection processor 304 may identify a number of channels that may be used to encrypt data payload 307. In an embodiment, payload protection processor 304 may determine a number of channels using input command 310.

At operation 410, reserved channels are determined. For example, payload protection processor 304 may determine whether one or more reserved channels 208 may be appended to digital payload 307. In an embodiment, payload protection processor 304 may determine a number of reserved channels 208 using input command 310.

At operation 412, a protection channel payload is assembled. For example, payload protection processor 304 may assemble protection channel payload 312. Protection channel payload 312 may identify which channel(s) may be encrypted using which cryptographic material(s). For example, protection channel payload 312 may indicate that a first portion of data payload 307 may be encrypted in the first channel using a first token 120 from a first cryptographic domain, and the second portion of data payload 307 may be encrypted in the second channel using a second token 120 from the second cryptographic domain. Further, protection channel payload 312 may identify that one of reserved channels 208 may be encrypted using a third token 120 from a third cryptographic domain. In some embodiments, operations 408 and 410 may also be included in operation 412.

At operation 414 a header is generated. For example, payload protection processor 304 may generate header 202. As discussed above, header 202 identifies how digital payload 118 may be processed and may include pointers to cryptographic functions and key repositories 122 that store tokens 120, etc.

At operation 416, a data payload and reserved channels are encrypted using cryptographic material in the protection channel payload. For example, channelized protection engine 306 may encrypt channels that include data payload 307 into payload 204 and content included in one or more reserved channels 208 with cryptographic material as indicated in protection channel payload 312.

At operation 418, the digital payload is assembled. For example, a wrapper function in channelized protection engine 306 may assemble header 202, payload 204, public information section 206 and reserved channels 208 into digital payload 118.

At operation 420 a determination is made from input command 310 regarding whether base payload 116 may be encrypted using single layer encryption or multi-layer encryption. In some embodiments, operation 420 may be performed by payload protection processor 304 and may be stored in header 202. In an embodiment, when base payload 116 may be encrypted with multiple layers of encryption, digital payload 118 may be output 316 and the flowchart proceeds to method 500. Otherwise, digital payload 118 may be output 314 that may be transmitted over network 102 or stored in one of computing devices 104.

Figure 5:
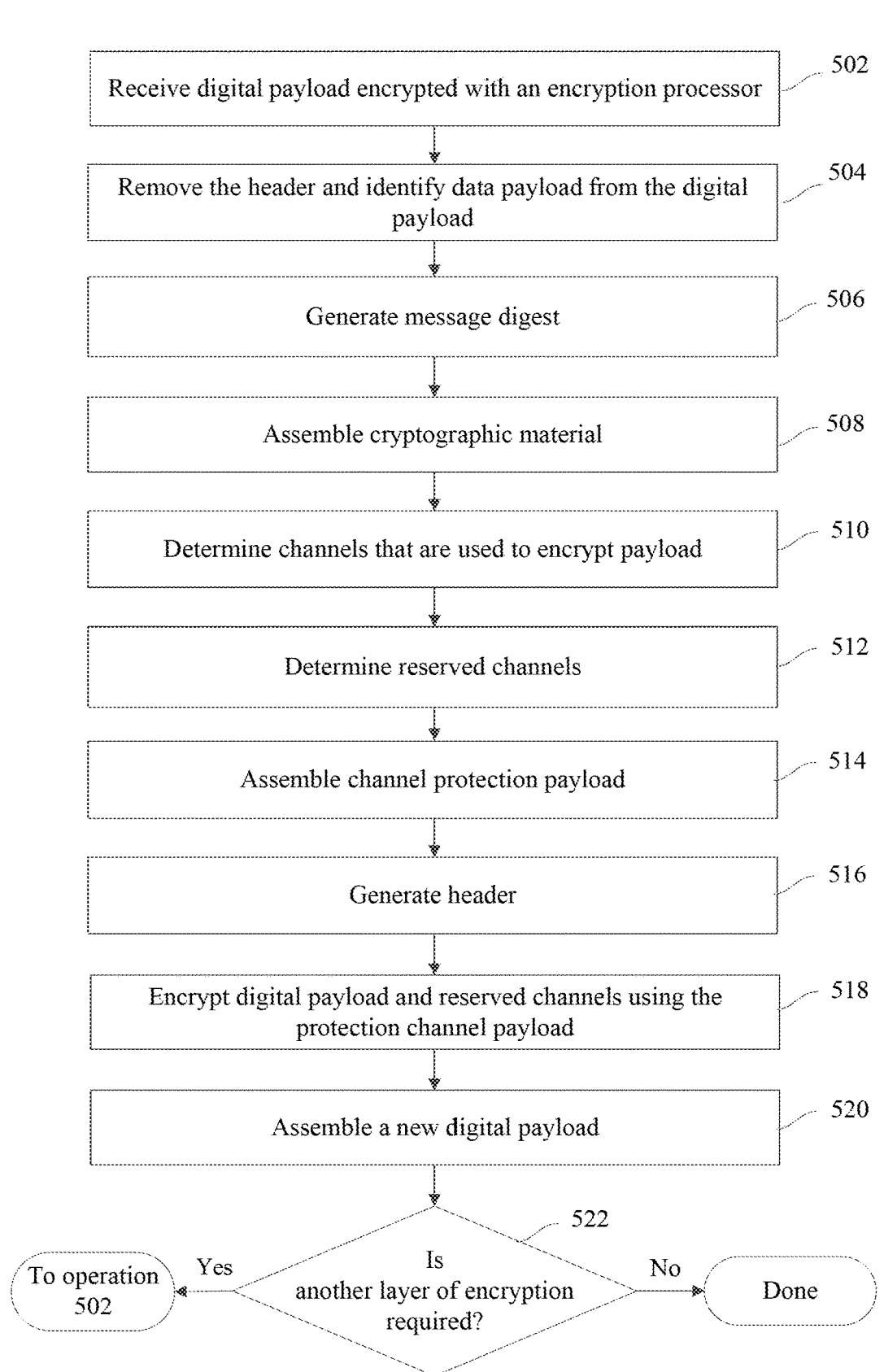
FIG. 5 is a flowchart of a method for encrypting a digital payload, according to an embodiment.

FIG. 5 is a flowchart of a method 500 for encrypting a digital payload, according to an embodiment. Method 500 may be implemented using hardware and software components described in FIGS. 1-3A-B. Note that one or more of the operations may be deleted, combined, or performed in a different order as appropriate. Further, method 500 typically occurs when encryption processor 112 encrypts base payload 116 recursively and with multiple layers of encryption.

At operation 502, the digital payload is received. For example, digest processor 302 receives digital payload 118 from channelized protection engine 306 for multi-layer encryption.

At operation 504, header from the digital payload is removed and data payload is identified. For example, digest processor 302 removes header 202 from digital payload 118. Digest processor 302 also identifies data payload 307 from digital payload 118, which may be payload 204 and/or reserved channels 208 in digital payload 118.

At operation 506, a message digest is generated. For example, digest processor 302 generates message digest 308 for digital payload 118. As discussed in FIG. 3B, digest processor 302 may pass header 202, data payload 307, and message digest 308 to payload protection processor 304.

At operation 508, cryptographic material is assembled. For example, payload protection processor 304 may use header 202 and message digest 308 to assemble cryptographic material, such as tokens 120, cryptographic functions, etc., from key repositories 122 from various cryptographic domains.

At operation 510, channels for encrypting digital payload are assembled. For example, payload protection processor 304 determines a number of channels that may be used to encrypt data payload 307 using cryptographic material assembled in operation 508. In an embodiment, the number of channels may be determined from input command 310, message digest 308 or header 202.

At operation 512, reserved channels are determined. For example, payload protection processor 304 may determine a number of reserved channels that may be used to encrypt portions of data payload 307, tokens 120 that were used to encrypt data payload 307, etc. In an embodiment, the number of channels may be determined from input command 310, message digest 308 or header 202.

At operation 514, the protection channel payload is assembled. For example, protection channel payload 312A may include one or more tokens 120, cryptographic functions, etc., that may be used to encrypt each channel and/or reserved channel determined in operations 510 and 512. In an embodiment, operations 510 and 512 may be included in operation 514.

At operation 516 a header is generated. For example, payload protection processor 304 may generate header 202 for digital payload 118A that may include channels determined in operation 508 and reserved channels determined in operation 510.

At operation 518, the digital payload is encrypted. For example, channelized protection engine 306 may encrypt data payload 307 generated during the previous layer using protection channel payload 312A into payload 204 of digital payload 118A. In another example, channelized protection engine 306 may use protection channel payload 312A to encrypt reserved channels 208 of digital payload 118A.

At operation 520, digital payload is assembled. For example, a wrapper function in channelized protection engine 306 may assemble header 202, payload 204, public information section 206 and reserved channels 208 of digital payload 118A.

At operation 522 a determination is made whether digital payload 118A may be encrypted using another layer of encryption. In some embodiments, operation 522 may be performed by payload protection processor 304 and may be stored in header 202 and/or message digest 308. In an embodiment, when digital payload 118A may be encrypted with another layer of encryption, the flowchart proceeds to operation 502 where digest processor 302 receives digital payload 118A. Otherwise, digital payload 118A may be output 314 that may be stored or transmitted over network 102.

Decryption Processor

Figure 6A:
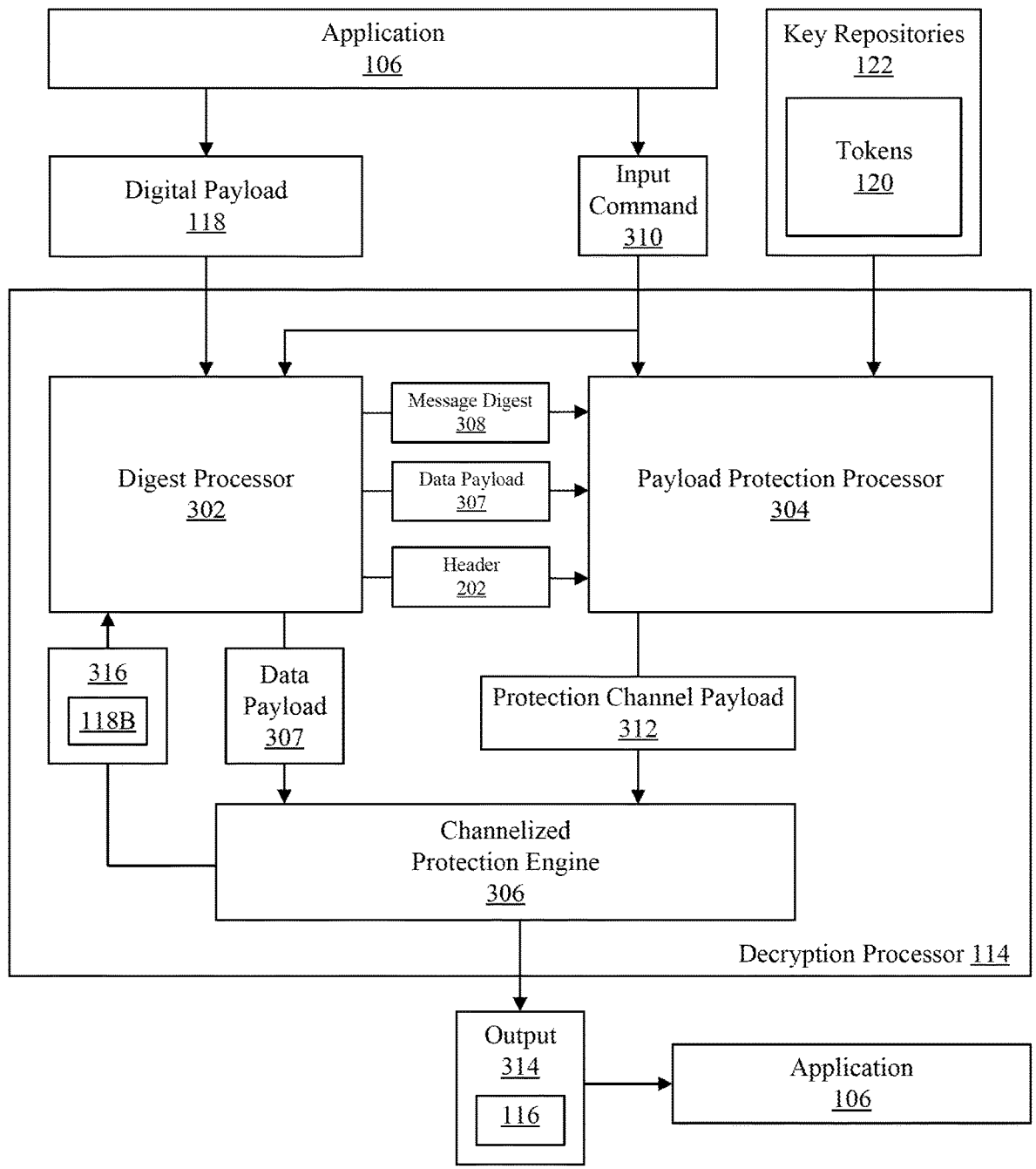
FIGS. 6A and 6B are block diagrams of a decryption processor, according to an embodiment.
Figure 6B:
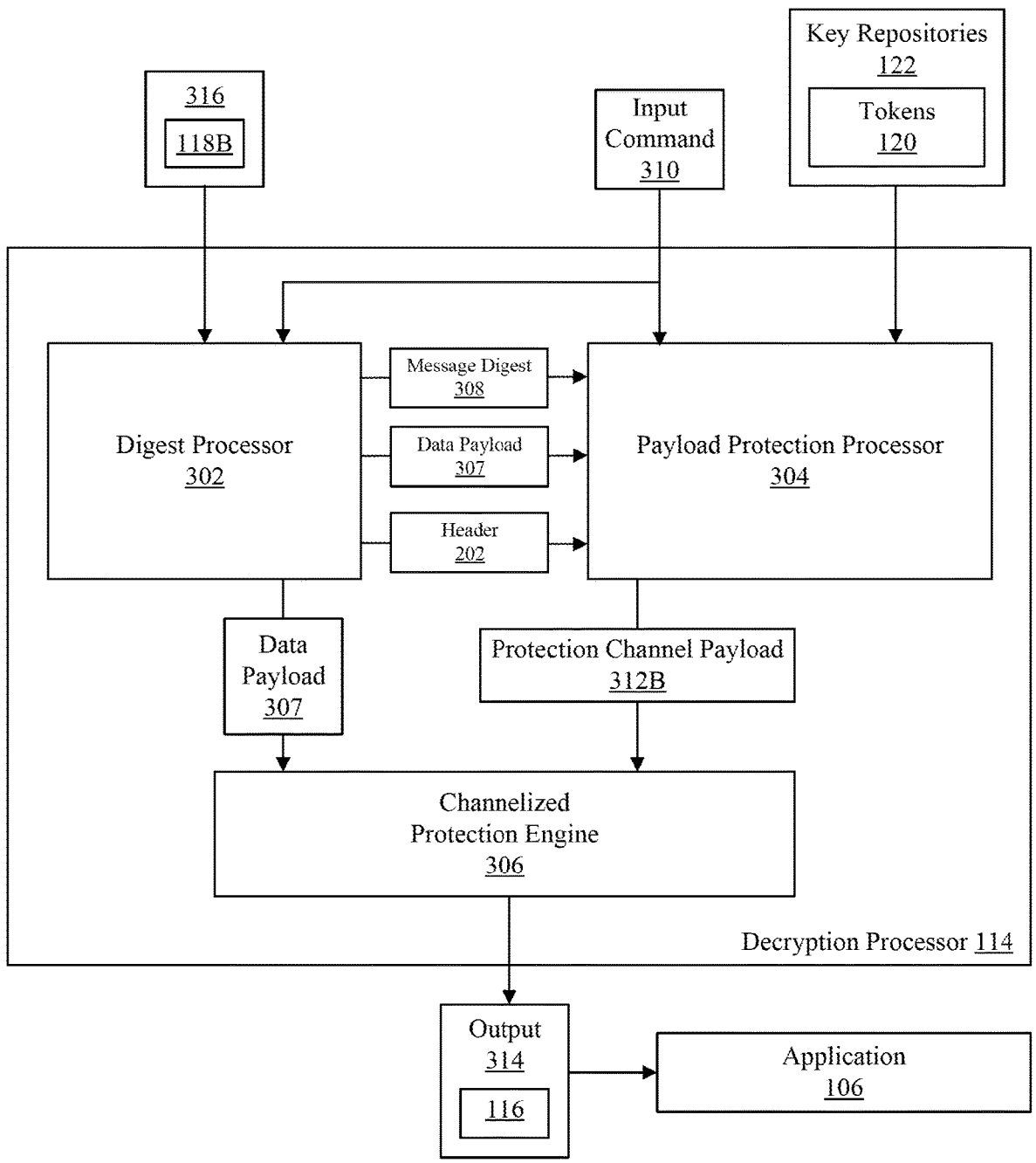

In an embodiment, digital payload 118 may be decrypted by decryption processor 114. FIGS. 6A and 6B are block diagrams 600A and 600B of a decryption processor, according to an embodiment. As illustrated in FIG. 6A, decryption processor 114 may also include digest processor 302, payload protection processor 304, and channelized protection engine 306. These components may be the same or different components as in encryption processor 112. Although shown as part of a single device, decryption processor 114 and its components may be implemented on multiple computing devices.

As illustrated in FIG. 6A, digest processor 302 may receive digital payload 118 from application 106. Digital payload 118 may be output 314 of encryption processor 112 that may have been encrypted using one or more layers of encryption. Once received, digest processor 302 may separate header 202 from digital payload 118 and may use header 202 to generate message digest 308. As discussed above, message digest 308 may include pointers that may facilitate access of the cryptographic material, such as pointers to key repositories 122, cryptographic functions, etc., in various cryptographic domains.

In an embodiment, digest processor 302 may pass or transmit header 202, and message digest 308 to payload protection processor 304.

In an embodiment, digest processor 302 may generate data payload 307. Data payload 307 may be digital payload 118 without header 202, or payload 204 and reserved channels 208 portions of digital payload 118. Digest processor 302 may pass or transmit data payload 307 to payload protection processor 304 and channelized protection engine 306.

In an embodiment, payload protection processor 304 may use header 202 to determine cryptographic domains, key repositories 122, tokens 120, cryptographic algorithms, etc., that may be used to decrypt various channels in payload 204 and reserved channels 208 of digital payload 118. Payload protection processor 304 may also retrieve the determined cryptographic material from various key repositories 122.

In an embodiment, payload protection processor 304 may also receive input command 310. Like in encryption processor 112, input command 310 may identify control operations that may be performed on data payload 307, decryption tokens 120 that may decrypt data payload 307, etc.

In an embodiment, payload protection processor 304 may generate protection channel payload 312. Protection channel payload 312 may include the cryptographic material that payload protection processor 304 may retrieve using header 202. In a further embodiment, protection channel payload 312 may also identify which key material may be used to decrypt payload 204 and/or reserved channels 208 of data payload 307. Once payload protection processor 304 generates protection channel payload 312, payload protection processor 304 may then pass or transmit protection channel payload 312 to channelized protection engine 306.

In an embodiment, the message digest 308 is transmitted from the digest processor 302 to the payload protection processor 304 for recursive processing. Recursive processing may be executed for cyclical decryption operations and processing across designated channels for sequential or parallel recursive operations.

In an embodiment, channelized protection engine 306 may receive protection channel payload 312 from payload protection processor 304 and data payload 307 from digest processor 302. Channelized protection engine 306 may use protection channel payload 312 to decrypt data payload 307, including payload 204 and/or reserved channels 208. In an embodiment, decryption processor 114 may decrypt different channels within payload 204 and/or reserved channels 208 sequentially or in parallel.

In an embodiment, channelized protection engine 306 may decrypt data payload 307 using the cryptographic algorithms specified in protection channel payload 312. As discussed above, example cryptographic algorithms may be an AES algorithm, blowfish algorithm, DES algorithm, RSA algorithm, twofish algorithm, another algorithm, or a combination of algorithms. Typically, the same algorithms may be used to decrypt data payload 307 as the algorithms used to encrypt base payload 116. As discussed above, channelized protection engine 306 may decrypt payload 204 that has been encrypted using multiple channels, with different algorithms and/or tokens 120 applied to each channel. Accordingly, channelized protection engine 306 may decrypt each channel using different algorithms and a decryption counterpart to tokens 120 used to encrypt base payload 116 into payload 204. In this way, if an unauthorized third party has obtained token 120 from a compromised cryptographic domain, the unauthorized third party may encrypt one channel in payload 204 and not in other channels that may be encrypted with tokens 120 from different cryptographic domains.

In an embodiment, channelized protection engine 306 may decrypt data payload 307 into output 314 or output 316. Output 314 may be base payload 116 that includes sensitive data. Accordingly, if base payload 116 has been encrypted using a single layer encryption, channelized protection engine 306 may generate base payload 116 on the first iteration. In an embodiment, decryption processor 114 may pass or transmit base payload 116 to application 106.

In an embodiment, where digital payload 118 is encrypted with multi-layer encryption, channelized protection engine 306 may generate output 316. Output 316 may be digital payload 118B that was encrypted as payload 204 in digital payload 118 and/or data, pointers to tokens 120, token 120, hidden header, etc., that was decrypted from reserved channels 208. In this case, channelized protection engine 306 may pass or transmit digital payload 118B and decrypted data from the reserved channels 208 back to digest processor 302.

FIG. 6B is a block diagram 600B that illustrates a decryption processor performing multi-layer decryption processing, according to an embodiment. As illustrated in FIG. 6B, digest processor 302 receives output 316 that may be digital payload 118B and uncovered/retrieved cryptographic material from the previous layer. Once received, digest processor 302 may generate message digest 308 for digital payload 118B. Message digest 308 may also include pointers from the uncovered/retrieved cryptographic material that may be used to decrypt digital payload 118B. As discussed in FIG. 6A, digest processor 302 may also remove header 202 from digital payload 118B and generate data payload 307 that may include payload 204 and/or reserved channels 208 of digital payload 118B.

In an embodiment, digest processor 302 may pass message digest 308, data payload 307, and data payload 307 to payload protection processor 304 and digital payload 118B to channelized protection engine 306. Payload protection processor 304 may then use header 202 to retrieve cryptographic material, such as tokens 120 from key repositories 122 of various cryptographic domains, memory storage 108, etc., that are referenced in message digest 308. Once retrieved, payload protection processor 304 may use message digest 308 to identify which cryptographic key material may decrypt which channel in payload 204 and reserved channels 208 of digital payload 118B and assemble protection channel payload 312B as discussed above.

Once payload protection processor 304 assembles protection channel payload 312B, payload protection processor 304 may pass or transmit protection channel payload 312B to channelized protection engine 306.

In an embodiment, channelized protection engine 306 may receive data payload 307 from digest processor 302 and protection channel payload 312B from payload protection processor 304. Channelized protection engine 306 may then decrypt data payload 307 that may be one or more channels in payload 204 and/or reserved channels 208 of digital payload 118B using cryptographic material assembled in protection channel payload 312B as discussed above.

In an embodiment, if channelized protection engine 306 decrypted the last layer of multi-layer decryption or if base payload 116 was encrypted using a single layer, channelized protection engine 306 may generate output 314 which includes base payload 116.

In an embodiment, if the decrypted payload 204 includes another digital payload 118, then channelized protection engine 306 generates output 316 and transmits output 316 to digest processor 302 for another layer of decryption (not shown). In an embodiment, the decryption process recursively repeats until there is no more encrypted material and decryption processor 114 decrypted base payload 116.

Figure 7:
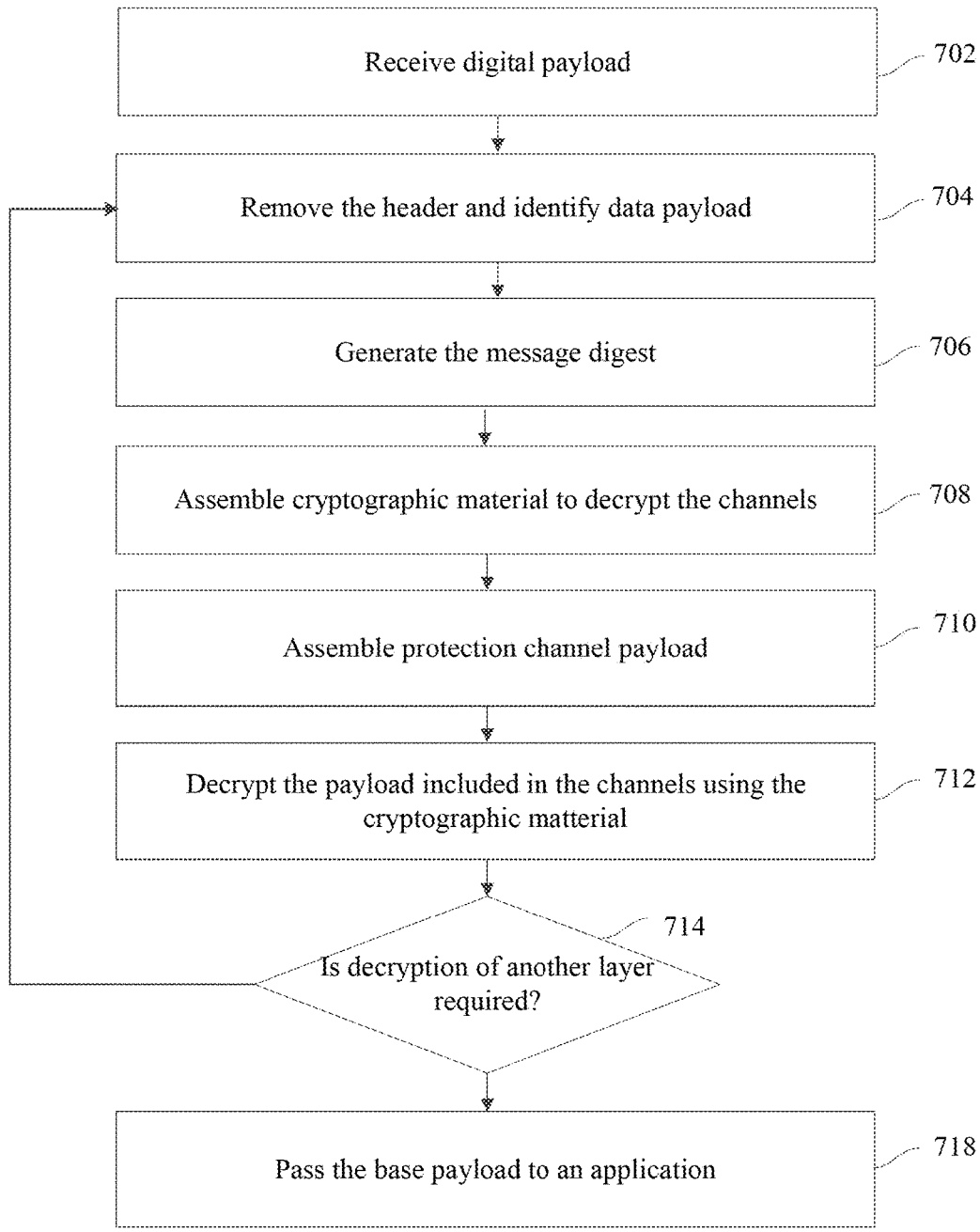
FIG. 7 is a flowchart of a method for decrypting a digital payload, according to an embodiment.

FIG. 7 is a flowchart of a method 700 for decrypting digital payload, according to an embodiment. Method 700 may be implemented using hardware and software components described in FIGS. 1-2 and 6A-B. Note that one or more of the operations may be deleted, combined, or performed in a different order as appropriate.

At operation 702, the digital payload is received. For example, decryption processor 114 may receive digital payload 118 from application 106 or memory storage 108. As discussed above, digital payload 118 may be decrypted using one or more layers.

At operation 704, a header from the digital payload is removed and data payload is identified. For example, digest processor 302 removes header 202 from digital payload 118 and identifies data payload 307 that may be payload 204 and/or reserved channels 208 of digital payload 118.

At operation 706, a message digest is generated. For example, digest processor 302 generates message digest 308 from digital payload 118. As discussed above, message digest 308 may include pointers to cryptographic material in different cryptographic domains that may be used to decrypt one or more channels in payload 204 or one or more reserved channels 208. As discussed above, digest processor 302 may pass or transmit data payload 307, header 202, and message digest 308 to payload protection processor 304.

At operation 708, cryptographic material is assembled. For example, payload protection processor 304 uses header 202 to obtain cryptographic material such as tokens 120 and cryptographic functions from various key repositories 122 in various cryptographic domains.

At operation 710, payload protection processor 304 may assemble protection channel payload 312. In protection channel payload 312, payload protection processor 304 may identify which channel in payload 204 and reserved channels 208 may be decrypted with which cryptographic material. Once protection channel payload 312 is assembled, protection channel payload 312 may be passed to channelized protection engine 306.

At operation 712, payload in the channels is decrypted. As discussed above, channelized protection engine 306 receives data payload 307 from digest processor 302 and protection channel payload 312 from payload protection processor 304. Once received, channelized protection engine 306 may decrypt channels in payload 204 and/or one or more reserved channels 208 with cryptographic material as indicated in protection channel payload 312. As discussed above, channelized protection engine 306 may encrypt payload 204 and/or reserved channels 208 sequentially or in parallel.

At operation 714, a determination is made whether another layer of decryption is required. For example, if digital payload 118 was encrypted using one encryption layer, channelized protection engine 306 may generate output 314 which may include base payload 116. In this case, decryption processor 114 completes decrypting base payload 116 and the flowchart proceeds to operation 718. Alternatively, if payload 204 includes a second digital payload 118B within payload 204, channelized protection engine 306 may pass digital payload 118B to digest processor 302 and repeat the decryption process beginning with operation 704.

At operation 718, base payload is passed to an application. For example, decryption processor 114 may pass base payload 116 to application 106.

Example Cryptographic Technique

Figure 8A:
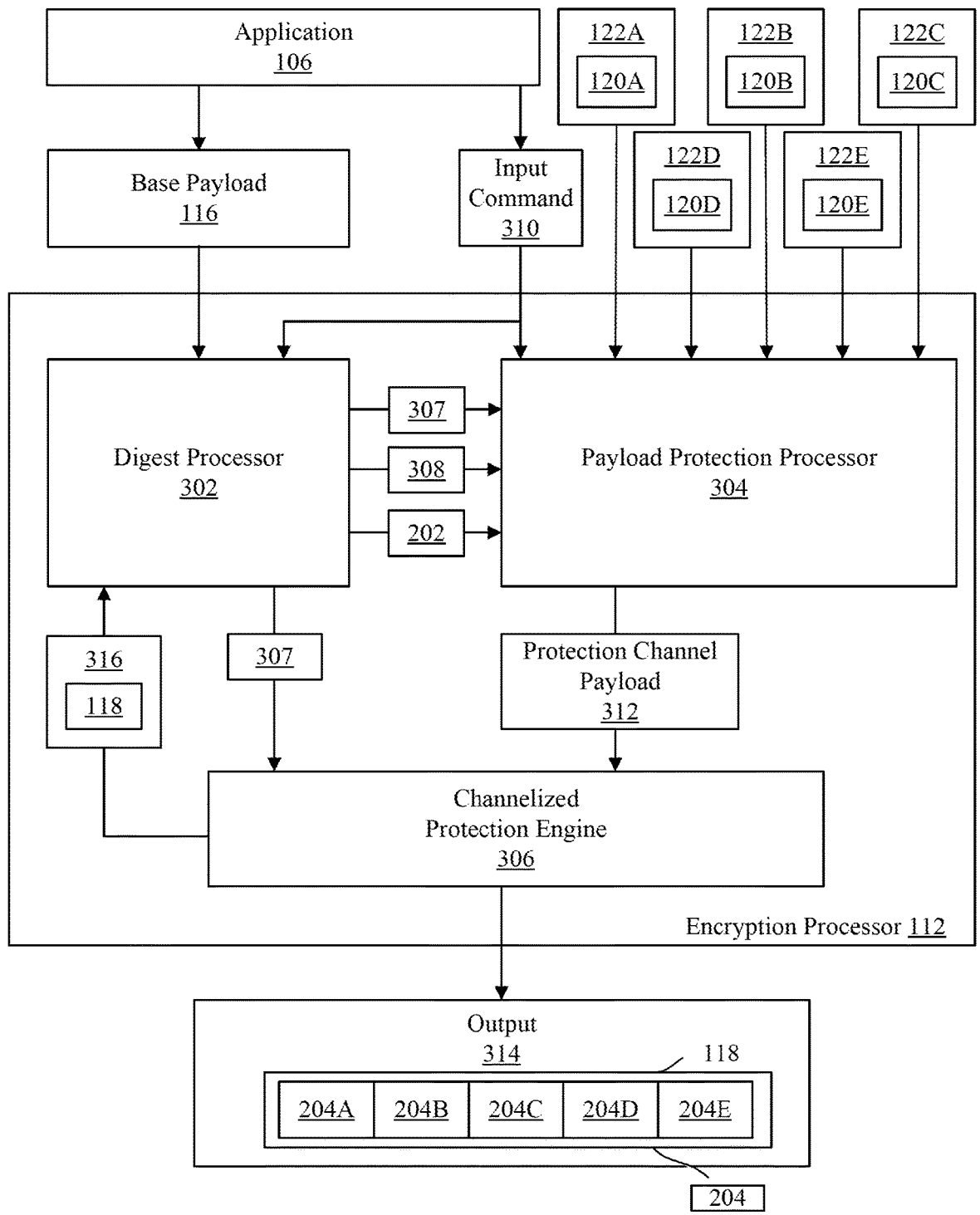
FIG. 8A is a block diagram of an encryption processor, according to an embodiment.

Going back to FIG. 1, there may be various advantages to encryption that uses multiple channels, multiple layers, and cryptographic material from various cryptographic domains. One advantage is that different portions of base payload 116 may be encrypted using different algorithms, cryptographic functions, and tokens 120, all of which are from different cryptographic domains. For example purposes only, suppose encryption processor 112 may receive base payload 116 that is a textual document that includes, for example, five separate sections. Using encryption processor 112 replicated in FIG. 8A, payload protection processor 304 may identify five channels, one channel per section of the textual document. Further, payload protection processor 304 may identify that the first channel should be encrypted with token 120A, the second channel should be encrypted with token 120B, the third channel should be encrypted with token 120C, the fourth channel should be encrypted with token 120D, and the fifth channel should be encrypted with token 120E, where each of tokens 120A-E may be from different cryptographic domain that includes key repositories 122A-E. In an embodiment, channelized protection engine 306 may encrypt the textual document using a single layer of encryption. In this case, channelized protection engine 306 may generate digital payload 118 as output 314 where payload 204 includes five channels 204A-E encrypted as discussed above.

Figure 8B:
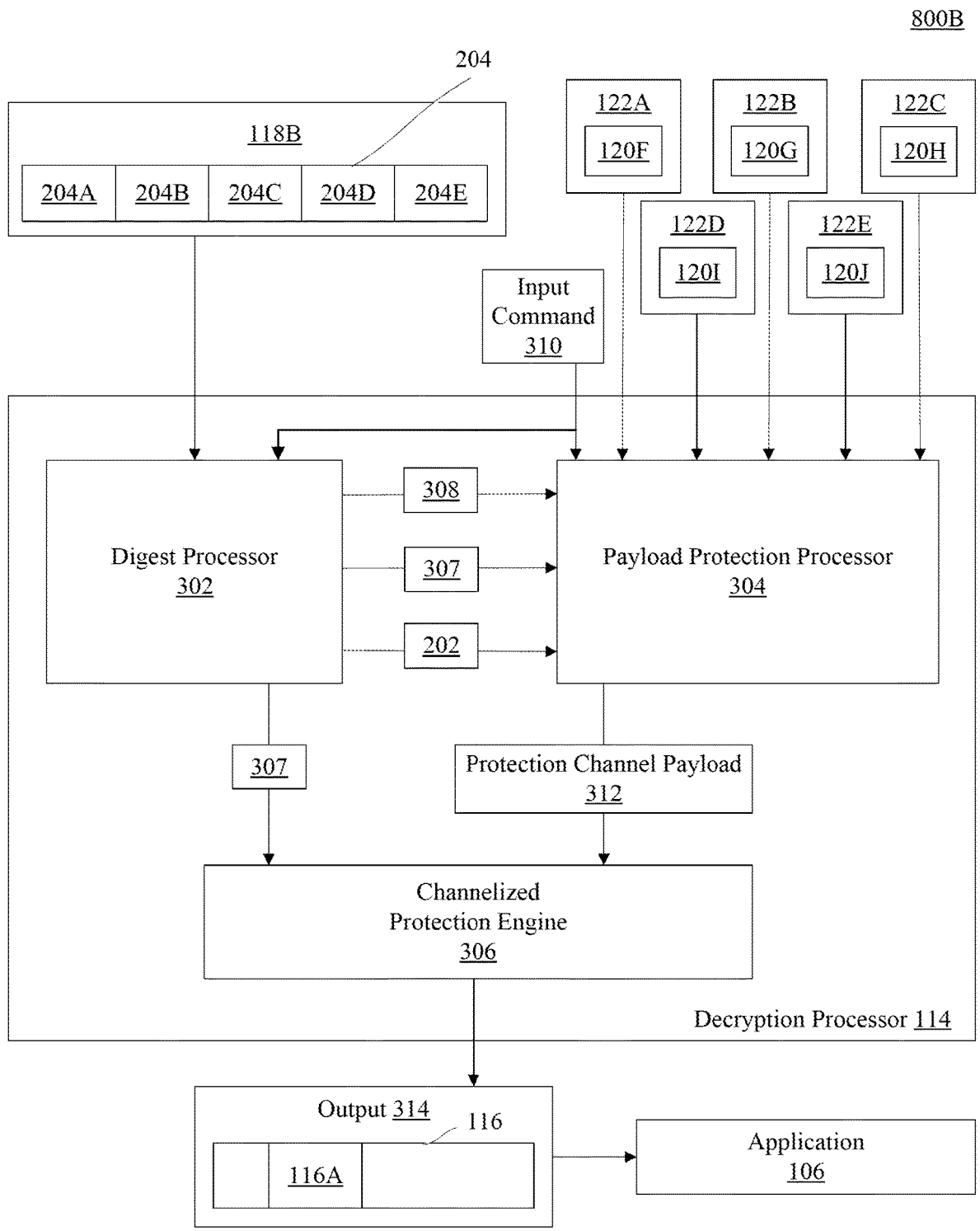
FIGS. 8B and 8C are block diagrams of a decryption processor, according to an embodiment.

To decrypt digital payload 118 that includes the encrypted textual document in channels 204A-E of payload 204, decryption processor 114 may receive digital payload 118 from application 106 as illustrated in FIG. 8B. Depending on access rights of users using application 106, payload protection processor 304 may obtain some or all decryption tokens 120 that are counterparts to tokens 120A-E and decrypt some or all channels with counterpart tokens 120A-E. Example tokens 120F-J are counterparts to tokens 120A-E, where token 120F is a counterpart to token 120A, token 120G is a counterpart to token 120B, token 120H is a counterpart to token 120C, token 120I is a counterpart to token 120D, and token 120J is a counterpart to token 120E.

Figure 8C:
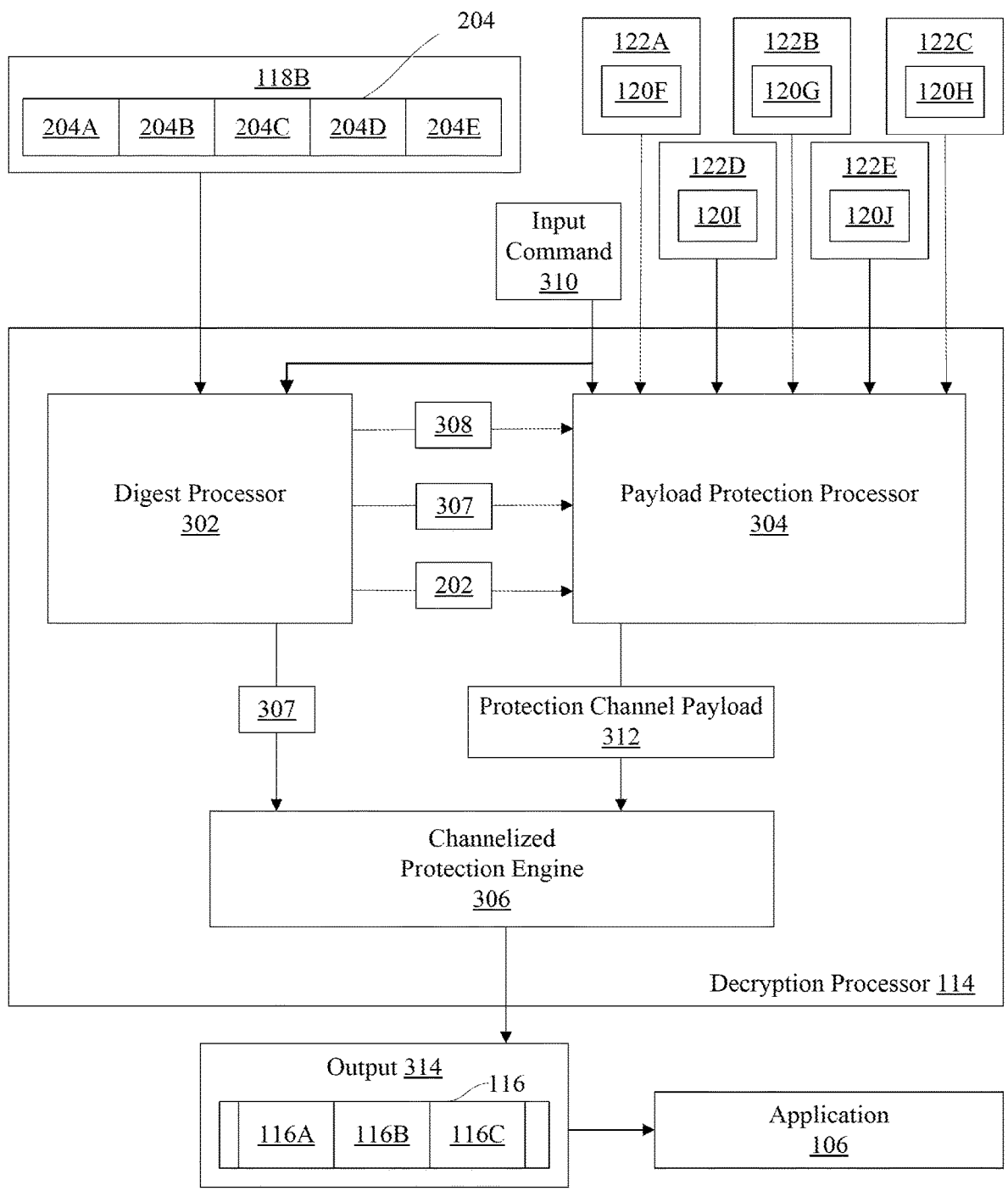

In an embodiment shown in FIG. 8B, payload protection processor 304 may obtain counterpart token 120F. In this case, channelized protection engine 306 may be able to decrypt channel 204A and obtain the first section of the textual document labeled as 116A. In another embodiment illustrated in FIG. 8C, payload protection processor 304 may obtain counterpart tokens 120F, 120G, and 120H and channelized protection engine 306 may be able to decrypt channels 204A, 204B, and 204C and retrieve first, second, and third sections of the textual document shown as 116A-B. In this way, different sections of the document may be decrypted by users who have access rights to one or more tokens 120F-J and, as a result, may view some or all sections of the textual document.

In this way, different sections of the textual document may be decrypted by entities that have counterpart decryption tokens 120F-J and as a result may only decrypt and view some, but not all, sections of the document.

In another embodiment, key repositories 122A-E may be owned by different cryptographic domains. In this case, if cryptographic domain that includes key repository 122A is compromised, the unauthorized third party may only access and decrypt the first section of the textual document labeled as 116A, and not the other sections of the textual document.

Reserved Channels

In an embodiment, reserved channels 208 may have various applications.

In an embodiment, one reserved channel of reserved channels 208 may be used to determine whether an unauthorized third party tampered with the encrypted base payload 116 or information that may be stored in another reserved channel of reserved channels 208. For example, in the first layer, encryption processor 112 may encrypt base payload 116 with token 120A into payload 204. Encryption processor 112 may then incorporate payload 204 into base payload 116 using a stenographic approach. In the second layer, encryption processor 112 may encrypt base payload 116 that includes payload 204 with token 120B. Additionally, during the second layer of encryption, encryption processor 112 may encrypt token 120A or a pointer to token 120A in one of reserved channels 208. In some embodiments, token 120A may be encrypted in a hidden header included in reserved channel 208. A hidden header may have the structure of header 202 and may be used to obtain token 120A from key repository 122 during the decryption process. In an embodiment, the second layer of encryption may generate digital payload 118.

During decryption, decryption processor 114 may determine whether base payload 116 encrypted as digital payload 118 was tampered with. For example, decryption processor 114 may decrypt digital payload 118 generated above. During the first layer of decryption, decryption processor 114 may decrypt reserved channel 208 and retrieve token 120A. Decryption processor 114 may also decrypt base payload 116 that includes payload 204 with a counterpart of token 120B. Decryption processor 114 may also remove the stenographical embedded payload 204 from base payload 116 and decrypt the embedded payload 204 with a counterpart to token 120A. If base payload 116 decrypted using token 120B and token 120A are different, then base payload 116 may have been tampered with by an unauthorized third party.

In yet another embodiment, a reserved channel in reserved channels 208 may include a software executable that may be encrypted and delivered separately from payload 204. The software executable may also be an instruction that causes the software to execute on computing device 104. For example, encryption processor 112 may use single layer encryption to encrypt payload 204 with token 120A and encrypt the software executable with token 120B in parallel.

In an embodiment, once decryption processor 114 decrypts the software executable in the reserved channel of reserved channel 208, the software executable may manipulate payload 204, decrypted base payload 116 or execute on computing device 104. For example, if payload 204 is an encrypted image, then reserved channels 208 may include a software executable or an instruction that may destroy the image at a predefined date or time. This may occur when decryption processor 114 may decrypt the reserved channel of reserved channels 208 after the predefined date and time expired, and then cause the software to execute on computing device 104 and destroy payload 204 or the decrypted base payload 116.

In yet another embodiment, reserved channels 208 may store instructions that manipulate tokens 120 that were used to encrypt or decrypt base payload 116 or one or more reserved channels 208. For example, the instructions may be to re-key token 120, revoke token 120, set an expiration date and time for token 120, generate a new token 120, etc., in one or more cryptographic domains. In this case, encryption processor 112 may encrypt base payload 116 with token 120 and include in a reserved channel of reserved channels 208 an instruction to key repository 122 to change its key structure, re-key or revoke token 120.

General Computer System

Figure 9:
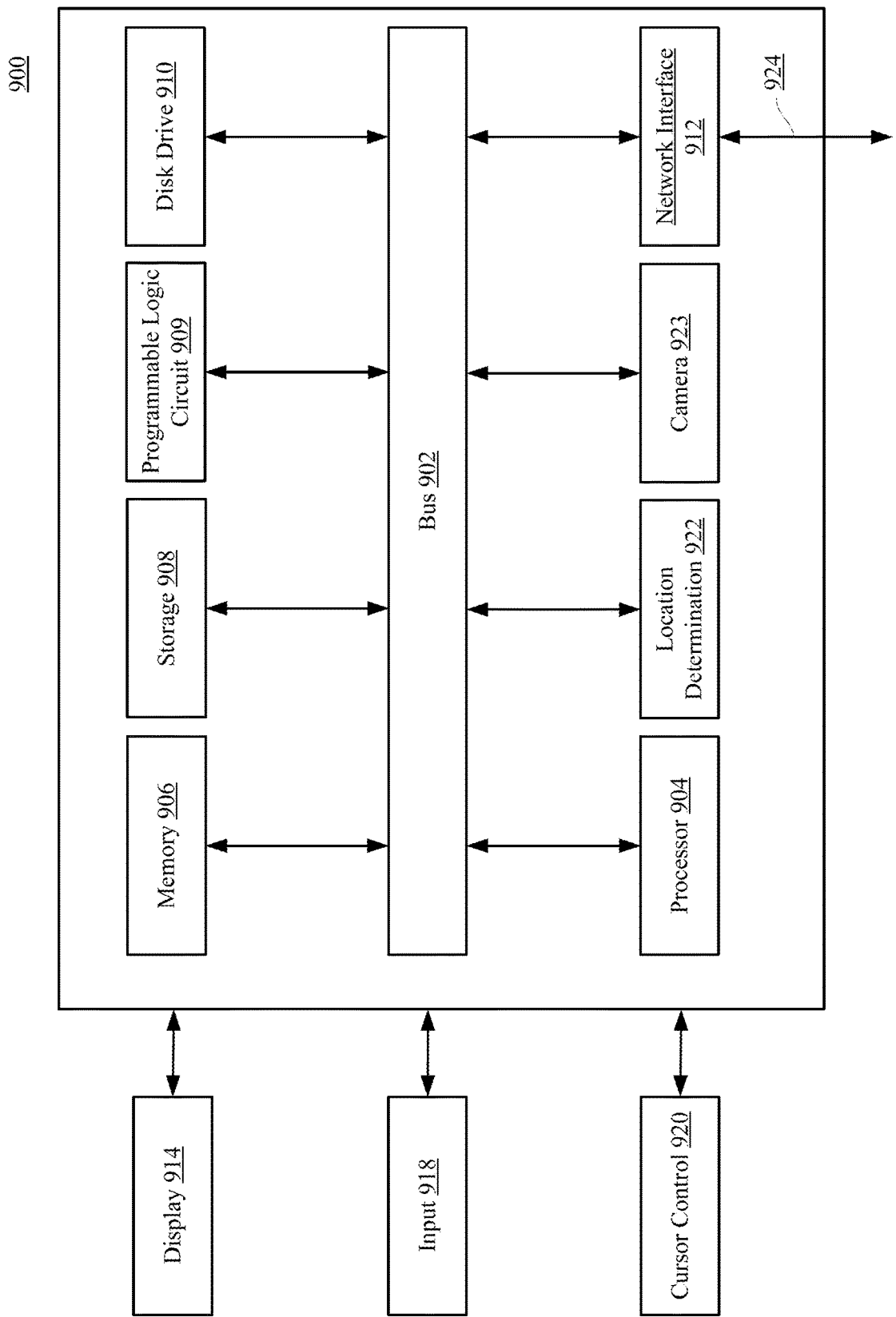
FIG. 9 is a block diagram of a computer system suitable for implementing one or more components in FIGS. 1-8, according to an embodiment.

Referring now to FIG. 9, an embodiment of a computer system 900 suitable for implementing the systems and methods described in FIGS. 1-8 is illustrated. Although shown as a single computer system 900, the disclosure is not limited to this embodiment and different components in FIGS. 1-8 may execute on one or more computer systems 900.

In accordance with various embodiments of the disclosure, computer system 900, such as a computer and/or a server, includes a bus 902 or other communication mechanism for communicating information, which interconnects subsystems and components, such as a processing component 904 (e.g., processor, micro-controller, digital signal processor (DSP), graphics processing unit (GPU), etc.), a system memory component 906 (e.g., random access memory or RAM), a static storage component 908 (e.g., read only memory or ROM), a programmable logic circuit 909 (e.g. programmable logic array or PLA), a disk drive component 910 (e.g., magnetic or optical), a network interface component 912 (e.g., modem or Ethernet card), a display component or a display screen 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may include a database having one or more disk drive components.

In accordance with embodiments of the disclosure, the computer system 900 performs specific operations by the processing component 904 executing one or more sequences of instructions contained in the memory component 906, such as described herein with respect to the mobile communications devices, mobile devices, and/or servers. Such instructions may be read into the system memory component 906 from another computer readable medium, such as the static storage component 908 or the disk drive component 910 or programmable logic circuit 909. In other embodiments, hard-wired circuitry may be used in place of or in combination with software instructions to implement the disclosure.

Logic may be encoded in a computer readable medium, which may refer to any medium that participates in providing instructions to the processing component 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that include the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 900. In various other embodiments of the disclosure, a plurality of the computer systems 900 coupled by a communication link 924 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components including software, hardware, and/or both without departing from the scope of the disclosure. Where applicable, the various hardware components and/or software components set forth herein may be separated into sub-components including software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
receiving a base payload;
receiving an input command, wherein the input command identifies cryptographic material used to encrypt the base payload;
assembling the cryptographic material from a plurality of different key repositories that are from a plurality of different cryptographic domains, respectively, wherein the plurality of different key repositories includes a first key repository and a second key repository that is different from the first key repository;
assembling channel protection payload that includes the cryptographic material, wherein assembling channel protection payload comprises:
determining a number of channels used to encrypt the base payload;
identifying a plurality of tokens from the cryptographic material to encrypt the number of channels; and
determining a method of encryption per channel;
encrypting a) a first portion of the base payload in a first channel of the number of channels with a first token from the plurality of tokens and b) a second portion of the base payload in a second channel of the number of channels with a second token from the plurality of tokens;
encrypting the base payload into a digital payload using the channel protection payload;
generating a header for the digital payload, wherein the header includes at least one pointer to each of the first key repository and the second key repository of the plurality of different key repositories; and
appending the header to the digital payload.

2. The system of claim 1, further comprising:
determining a number of reserved channels, wherein a reserved channel in the reserved channels may include a pointer from the cryptographic material used to encrypt the base payload; and
encrypting the reserved channel using a token from the plurality of tokens from the cryptographic material.

3. The system of claim 1, wherein the digital payload includes at least the header, a payload that includes the encrypted base payload, and at least one reserved channel.

4. The system of claim 1, further comprising:
receiving the digital payload;
generating, using the header from the digital payload, a message digest;
assembling a second cryptographic material using the message digest;
assembling a second channel protection payload that includes the second cryptographic material; and
encrypting the digital payload into a second digital payload using the second channel protection payload.

5. The system of claim 4, wherein a payload of the second digital payload includes the digital payload encrypted using a token from the second cryptographic material.

6. The system of claim 4, further comprising:
identifying a reserved channel for the second digital payload;
including the cryptographic material used to encrypt the digital payload in the reserved channel; and
encrypting the reserved channel using a token from the second cryptographic material.

7. The system of claim 4, further comprising:
identifying a number of channels to encrypt the digital payload in the second digital payload; and
encrypting the digital payload in the number of channels with the second cryptographic material.

8. The system of claim 4, further comprising:
generating the header for the second digital payload.

9. The system of claim 8, wherein the header includes at least one pointer to a cryptographic domain that includes the second cryptographic material.

10. A method, comprising:
receiving a base payload from an application executing on a computing device;
receiving an input command at a payload protection processor, wherein the input command identifies cryptographic material used to encrypt the base payload;
assembling the cryptographic material from a plurality of different key repositories, wherein a first key repository in the plurality of key repositories and a second key repository in the plurality of different key repositories are in different cryptographic domains;
assembling channel protection payload that includes the cryptographic material;
identifying a plurality of channels to encrypt the base payload;
encrypting the base payload into the plurality of channels, wherein each channel in the plurality of channels is encrypted using a token from the cryptographic material assembly from the different cryptographic domains;
encrypting, in a channelized protection engine, the base payload into a digital payload using the channel protection payload;
generating a header for the digital payload, wherein the header includes at least one pointer to each of a first key repository and a second key repository of the plurality of different key repositories; and
appending the header to the digital payload.

11. The method of claim 10, further comprising:
identifying a plurality of reserved channels;
including the cryptographic material used to encrypt the base payload in the plurality of reserved channels;
encrypting the plurality of reserved channels; and
appending the plurality of reserved channels to the digital payload.

12. The method of claim 10, further comprising:
generating a header for the digital payload, wherein the header includes at least one pointer to at least one cryptographic domain that includes the cryptographic material; and
appending the header to the digital payload.

13. The method of claim 12, further comprising:

receiving, at a digest processor, the digital payload;

generating, using the header from the digital payload, a message digest;

assembling, at the payload protection processor, a second cryptographic material using the message digest;

assembling a second channel protection payload that includes the second cryptographic material, a plurality of channels to encrypt the digital payload, and a plurality of reserved channels;

encrypting the digital payload into payload of a second digital payload that includes the plurality of channels using a portion of the cryptographic material;

encrypting an instruction that manipulates the digital payload in the plurality of reserved channels of the second digital payload; and appending a second header to the second digital payload, wherein the header includes at least one pointer to the second cryptographic material.

14. A system, comprising:

a non-transitory memory storing instructions; and one or more hardware processors coupled to the non-transitory memory and configured to read the instructions from the non-transitory memory to cause the system to perform operations comprising:

receiving a digital payload, wherein the digital payload includes a header, a payload, and at least one reserved channel, wherein the header includes a first pointer to a first cryptographic domain and a second pointer to a second cryptographic domain that is different from the first cryptographic domain;

removing the header from the digital payload;

generating, using the header, a message digest of the digital payload;

assembling, using the message digest, cryptographic material from a plurality of different key repositories, wherein the cryptographic material is used to decrypt the payload and the plurality of key repositories includes at least the first pointer to the first cryptographic domain and the second pointer to the second cryptographic domain;

assembling a channel protection payload, wherein the channel protection payload identifies a first portion of the cryptographic material that decrypts the payload and a second portion of the cryptographic material that decrypts the at least one reserved channel; and decrypting the payload in digital payload using a first token from the first portion of the cryptographic material and decrypting the reserved channel using a second token from the second portion of the cryptographic material.

15. The system of claim 14, wherein the decrypted payload includes a second digital payload and the operations further comprise:

removing a header of the second digital payload;

generating, using a header, a second message digest;

assembling, using a second digest and content of the decrypted reserved channel a second cryptographic material; and decrypting the second digital payload using the second cryptographic material, wherein the second digital payload includes readable electronic information.

16. The system of claim 14, wherein the decrypting digital payload is plaintext.

* * * * *